US010965723B2

(12) United States Patent
Taine et al.

(10) Patent No.: US 10,965,723 B2
(45) Date of Patent: *Mar. 30, 2021

(54) INSTANTANEOUS CALL SESSIONS OVER A COMMUNICATIONS APPLICATION

(71) Applicant: Facebook, Inc., Menlo Park, CA (US)

(72) Inventors: Stephane Taine, Issaquah, WA (US); Edward Young Zhang, San Francisco, CA (US); Dwayne B. Mercredi, Kirkland, WA (US); Michael Leggett, Seattle, WA (US); Brendan Benjamin Aronoff, Menlo Park, CA (US); Peter Henry Martinazzi, San Francisco, CA (US); Evan Patrick Noon, Seattle, WA (US); Duckjin Kang, Issaquah, WA (US); John Randall Ehrhardt, Issaquah, WA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/748,310

(22) Filed: Jan. 21, 2020

(65) Prior Publication Data

US 2020/0162522 A1 May 21, 2020

Related U.S. Application Data

(63) Continuation of application No. 15/148,772, filed on May 6, 2016, now Pat. No. 10,609,093.

(51) Int. Cl.
*H04L 29/06* (2006.01)
*H04L 29/08* (2006.01)
*H04L 12/58* (2006.01)

(52) U.S. Cl.
CPC ........ *H04L 65/1069* (2013.01); *H04L 51/043* (2013.01); *H04L 51/046* (2013.01);
(Continued)

(58) Field of Classification Search
CPC ..... H04L 65/1069; H04L 67/22; H04L 67/20; H04L 65/4015; H04L 51/20; H04L 51/10;
(Continued)

(56) References Cited

U.S. PATENT DOCUMENTS 6,823,364 B1 * 11/2004 Sollee ................ H04L 12/1813
709/204
2003/0035526 A1 * 2/2003 Bull ........................ H04M 3/02
379/142.08

(Continued)

*Primary Examiner* — Christopher B Robinson
(74) *Attorney, Agent, or Firm* — Baker Botts L.L.P.

(57) ABSTRACT

In one embodiment, a method includes determining, by a computer server machine, that a callee-user is available for a communication session based on location information associated with a client system of the callee-user; sending, by the computer server machine, in response to determining that the callee-user is available, a notification to a client system of a caller-user indicating that the callee-user is available; receiving, by the computer server machine, a request from the client system of the caller-user to initiate the communication session; establishing, by the computer server machine, the communication session to enable a media stream comprising media captured at the client system of the caller-user to be received at the client system of a callee-user; and sending, by the computer server machine, the media captured at the client system of the caller-user to the client system of the callee-user.

20 Claims, 14 Drawing Sheets

(52) U.S. Cl.
CPC .............. *H04L 51/10* (2013.01); *H04L 51/20* (2013.01); *H04L 51/32* (2013.01); *H04L 65/4015* (2013.01); *H04L 65/607* (2013.01); *H04L 67/18* (2013.01); *H04L 67/20* (2013.01); *H04L 67/22* (2013.01); *H04L 69/24* (2013.01)

(58) Field of Classification Search
CPC ....... H04L 51/043; H04L 67/18; H04L 51/32; H04L 65/607; H04L 69/24; H04L 51/046; H04L 67/11
See application file for complete search history.

(56) References Cited

U.S. PATENT DOCUMENTS

| | | | |
|---|---|---|---|
| 2005/0169446 A1* | 8/2005 | Randall | H04M 3/42382 379/93.23 |
| 2007/0153776 A1* | 7/2007 | Joseph | H04L 29/06027 370/356 |
| 2010/0002859 A1* | 1/2010 | Hepworth | H04L 51/043 379/140 |
| 2013/0336310 A1* | 12/2013 | Laasik | H04M 3/02 370/352 |
| 2014/0111691 A1* | 4/2014 | Kim | H04N 21/2365 348/566 |
| 2014/0160995 A1* | 6/2014 | Thorpe, III | H04L 12/1818 370/261 |
| 2016/0036874 A1* | 2/2016 | Mezhibovsky | H04L 67/18 705/7.19 |

* cited by examiner

INSTANTANEOUS CALL SESSIONS OVER A COMMUNICATIONS APPLICATION

PRIORITY

This application is a continuation under 35 U.S.C. § 120 of U.S. patent application Ser. No. 15/148,772, filed 6 May 2016.

TECHNICAL FIELD

This disclosure generally relates to user interfaces and establishing media communications among users, particularly within the context of a communications application.

BACKGROUND

A user interface (UI), in the industrial design field of human-machine interaction, is the space where interactions between humans and machines occur. The goal of the interactions between a human, often referred to as a "user," and a machine at the user interface is the user's control of the machine and its operations (e.g., through user input) and machine feedback (e.g., through program output). A graphical user interface (GUI) is a type of user interface that allows users to interact with software applications executing on electronic or computing devices through multimedia objects (e.g., images, videos, audios, etc.) rather than purely text commands. A user interface may allow users to interact with a social-networking system.

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

A mobile computing device—such as a smartphone, tablet computer, or laptop computer—may include functionality for determining its location, direction, or orientation, such as a GPS receiver, compass, gyroscope, or accelerometer. Such a device may also include functionality for wireless communication, such as BLUETOOTH communication, near-field communication (NFC), or infrared (IR) communication or communication with a wireless local area networks (WLANs) or cellular-telephone network. Such a device may also include one or more cameras, scanners, touchscreens, microphones, or speakers. Mobile computing devices may also execute software applications, such as games, web browsers, or social-networking applications. With social-networking applications, users may connect, communicate, and share information with other users in their social networks.

SUMMARY OF PARTICULAR EMBODIMENTS

In particular embodiments a client system (e.g., a mobile device) of a first user may launch a video-call session to enable a video stream for display in a small-overlay-window on a display of the client system of the first user. The client system of the first user may receive a video stream comprising video captured at a client system of a second user. The client system of the first user may display the video stream in the small-overlay-window. The small-overlay-window may be positioned over an active application running on the client system of the first user. Displaying video streams in a small-overlay-window (or any subregion smaller than the entire region) may be advantageous to users who need to multitask. A user may be able do other tasks such as composing emails, watching videos, or playing games, while simultaneously engaging in a video-call session. A user may be able to do several of these activities over an extended time period without a break in continuity, in context, or otherwise. As an example and not by way of limitation, a user may be playing a game on the user's client system when a friend initiates a video-call session. In this example, the user may accept the video call from the friend without interruption to the user's game, allowing for a seamless user experience where accepting a call causes minimal interference with the user's current activities. As another example and not by way of limitation, the user may be engaged in a video-call session with a friend and may decide to watch a video suggested by the friend. In this example, the user may launch an application associated with a video-sharing platform and watch the video without any interruption to the ongoing video-call session. The methods described herein may also be useful for users who want to collaborate on an activity or otherwise engage in the activity together. As an example and not by way of limitation, multiple users may be working on a single crossword puzzle together in a crossword-puzzle application. In this example, the users may want to be engaged in a video-call session among themselves while they collaborate on solving the crossword puzzle. As another example and not by way of limitation, multiple users may want to watch a TV show together while being engaged in a video-call session among themselves.

In particular embodiments, a communication system (e.g., the social-networking system) may determine an occurrence of a trigger event indicating availability of a callee-user for a call session with a caller-user. The a communication system may send a notification to a client system of the caller-user indicating an availability of the callee-user to participate in the call session. The notification may only be sent if there is a threshold level of certainty that the callee-user is available, which may include consideration of one or more negative or positive conditions. The a communication system may receive a request from the client system of the caller-user to initiate the call session. The a communication system may establish the call session to enable a media stream comprising media captured at the client system of the caller-user to be received at the client system of the callee-user. The a communication system may send the media captured at the client system of the caller-user to the client system of the callee-user. A goal of the disclosed method is to encourage the use of media communications, particularly with the use of call sessions. One way it does so is by making the experience of setting up a session smoother and more instantaneous. Almost immediately after a caller-user requests a call session, the callee-user is presented with media from the caller-user. With minimal effort, the callee-user may choose to send back media. The result is a disruption of the traditional, cumbersome model of requesting a call, waiting for the call to be accepted, and finally sending media once the call is accepted. Another way the disclosed method may encourage the use of media communications is by promoting the call session functionality to a caller-user at the right time (e.g., when the callee-user is available or interested in a call session), thereby increasing the chance that a request for a call session will be received favorably and likely resulting in a positive call session experience. Over time, having such positive experiences with call sessions may encourage users to make more use of call sessions. Promoting the call session functionality at the right time also serves to reinforce the smoothness and instantaneousness of the experience, because it ensures that the caller-user is rarely refused or left waiting (e.g., a user who is available will be much more likely to respond quickly). The caller-user experiences a much quicker connection with the callee-user, without much uncertainty about whether the other user will refuse the call.

The embodiments disclosed above are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
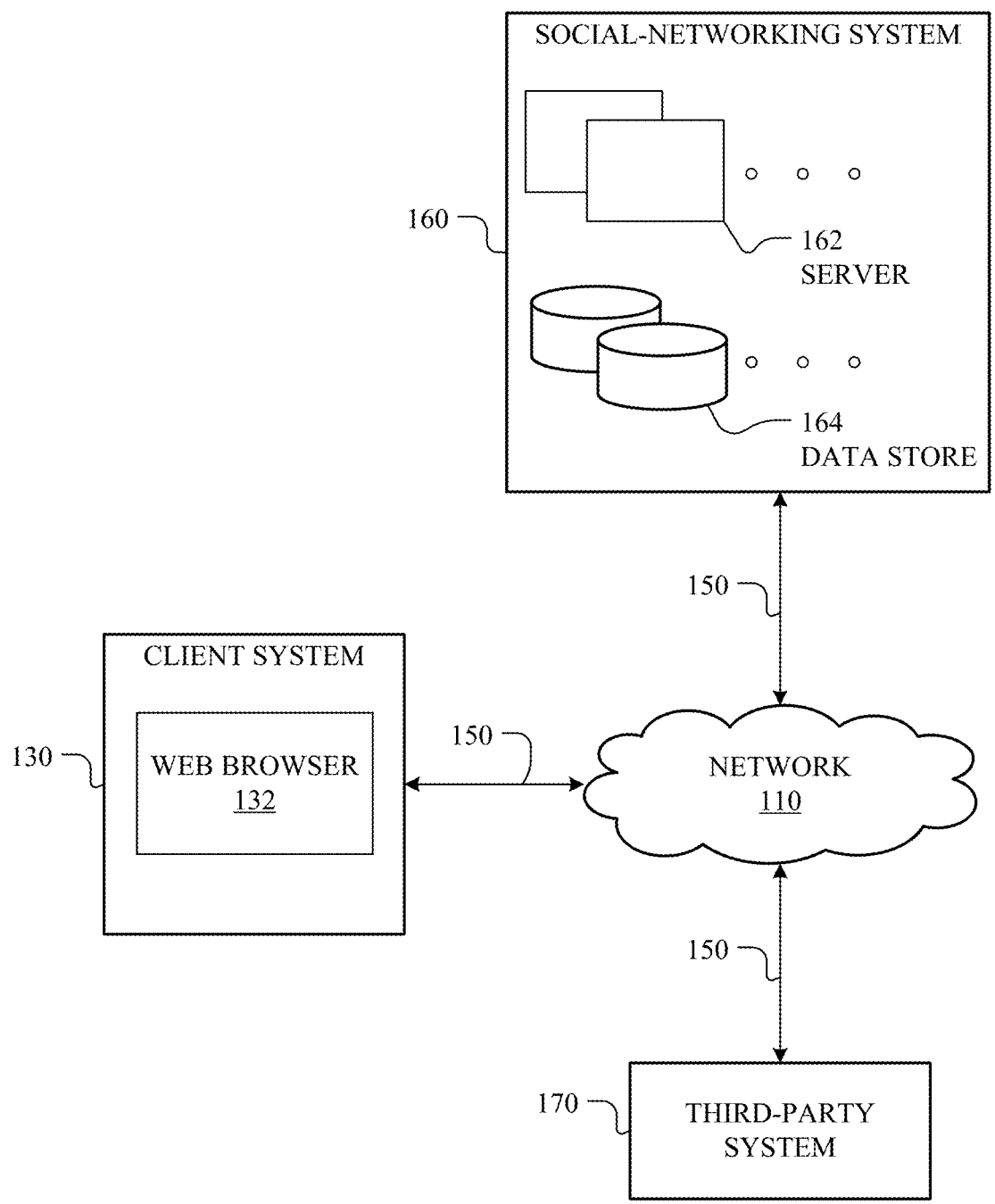
FIG. 1 illustrates an example network environment associated with a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, augmented/virtual reality device, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. As an example and not by way of limitation, client system 130 may access social-networking system 160 using a web browser 132, or a native application associated with social-networking system 160 (e.g., a mobile social-networking application, a messaging application, another suitable application, or any combination thereof) either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 160 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 to whom they want to be connected. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party system 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

Figure 2:
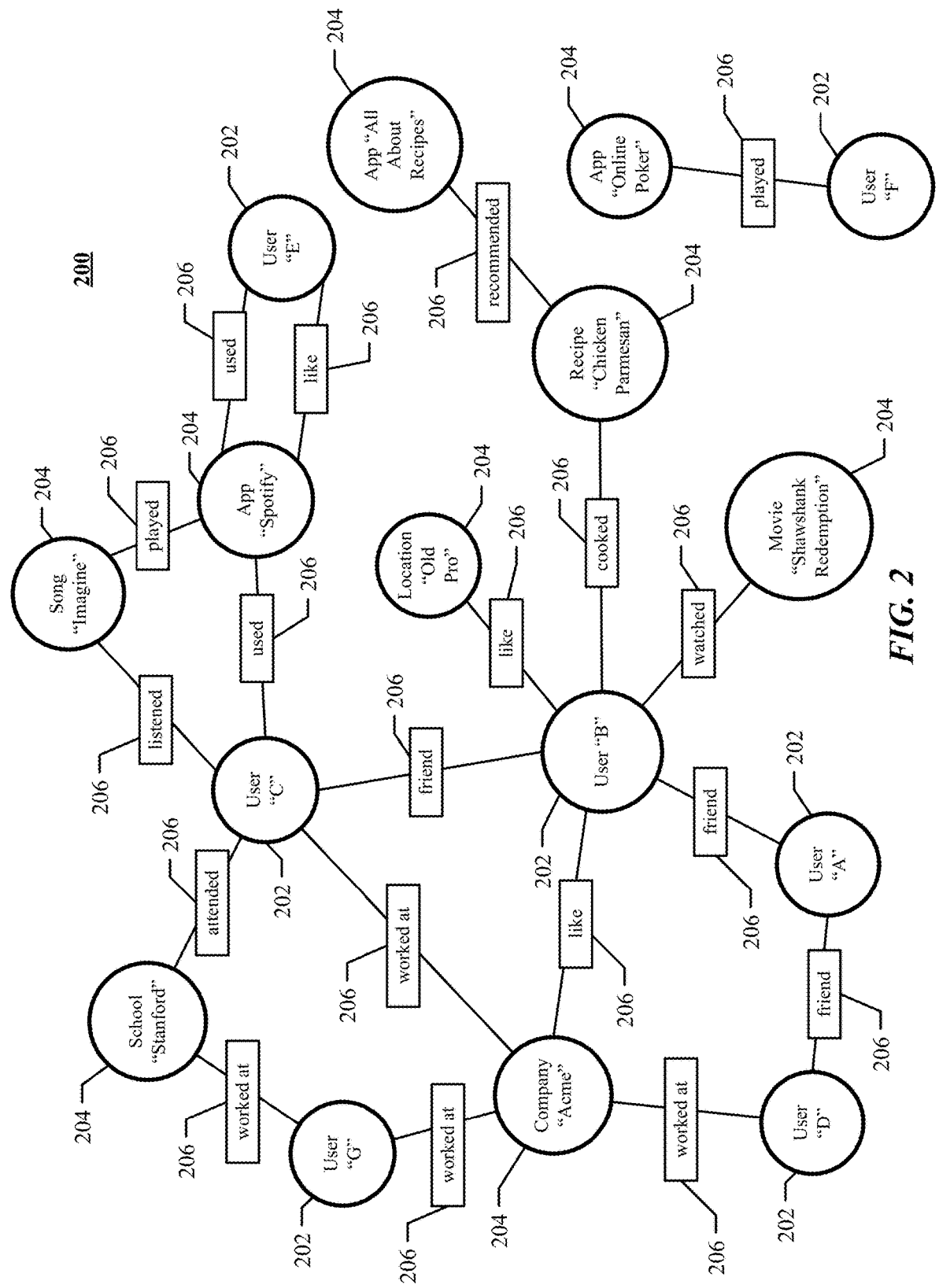
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 130 to send to social-networking system 160 a message indicating the user's action. In response to the message, social-networking system 160 may create an edge (e.g., a check-in-type edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more of data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of a observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200 (i.e., fewer degrees of separation) may have a higher coefficient than entities that are further apart in the social graph 200.

In particular embodiments, social-networking system 160 may calculate a coefficient based on location information.

Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503093, filed 11 Aug. 2006, U.S. patent application Ser. No. 12/977027, filed 22 Dec. 2010, U.S. patent application Ser. No. 12/978265, filed 23 Dec. 2010, and U.S. patent application Ser. No. 13/632869, filed 1 Oct. 2012, each of which is incorporated by reference.

In particular embodiments, one or more objects (e.g., content or other types of objects) of a computing system may be associated with one or more privacy settings. The one or more objects may be stored on or otherwise associated with any suitable computing system or application, such as, for example, a social-networking system 160, a client system 130, a third-party system 170, a social-networking application, a messaging application, a photo-sharing application, or any other suitable computing system or application. Although the examples discussed herein are in the context of an online social network, these privacy settings may be applied to any other suitable computing system. Privacy settings (or "access settings") for an object may be stored in any suitable manner, such as, for example, in association with the object, in an index on an authorization server, in another suitable manner, or any suitable combination thereof. A privacy setting for an object may specify how the object (or particular information associated with the object) can be accessed, stored, or otherwise used (e.g., viewed, shared, modified, copied, executed, surfaced, or identified) within the online social network. When privacy settings for an object allow a particular user or other entity to access that object, the object may be described as being "visible" with respect to that user or other entity. As an example and not by way of limitation, a user of the online social network may specify privacy settings for a user-profile page that identify a set of users that may access work-experience information on the user-profile page, thus excluding other users from accessing that information.

In particular embodiments, privacy settings for an object may specify a "blocked list" of users or other entities that should not be allowed to access certain information associated with the object. In particular embodiments, the blocked list may include third-party entities. The blocked list may specify one or more users or entities for which an object is not visible. As an example and not by way of limitation, a user may specify a set of users who may not access photos albums associated with the user, thus excluding those users from accessing the photo albums (while also possibly allowing certain users not within the specified set of users to access the photo albums). In particular embodiments, privacy settings may be associated with particular social-graph elements. Privacy settings of a social-graph element, such as a node or an edge, may specify how the social-graph element, information associated with the social-graph element, or objects associated with the social-graph element can be accessed using the online social network. As an example and not by way of limitation, a particular concept node 204 corresponding to a particular photo may have a privacy setting specifying that the photo may be accessed only by users tagged in the photo and the tagged user's friends. In particular embodiments, privacy settings may allow users to opt in to or opt out of having their content, information, or actions stored/logged by the social-networking system 160 or shared with other systems (e.g., a third-party system 170). Although this disclosure describes using particular privacy settings in a particular manner, this disclosure contemplates using any suitable privacy settings in any suitable manner.

In particular embodiments, privacy settings may be based on one or more nodes or edges of a social graph 200. A privacy setting may be specified for one or more edges 206 or edge-types of social graph 200, or with respect to one or more nodes 202, 204 or node-types of social graph 200. The privacy settings applied to a particular edge 206 connecting two nodes may control whether the relationship between the two entities corresponding to the nodes is visible to other users of the online social network. Similarly, the privacy settings applied to a particular node may control whether the user or concept corresponding to the node is visible to other users of the online social network. As an example and not by way of limitation, a first user may share an object to the social-networking system 160. The object may be associated with a concept node 204 connected to a user node 202 of the first user by an edge 206. The first user may specify privacy settings that apply to a particular edge 206 connecting to the concept node 204 of the object, or may specify privacy settings that apply to all edges 206 connecting to the concept node 204. As another example and not by way of limitation, the first user may share a set of objects of a particular object-type (e.g., a set of images). The first user may specify privacy settings with respect to all objects associated with the first user of that particular object-type as having a particular privacy setting (e.g., specifying that all images posted by the first user are visible only to friends of the first user and/or users tagged in the images).

Privacy settings associated with an object may specify any suitable granularity of permitted access or denial of access. As an example and not by way of limitation, access or denial of access may be specified for particular users (e.g., only me, my roommates, my boss), users within a particular degrees-of-separation (e.g., friends, friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable entities, or any suitable combination thereof. In particular embodiments, access or denial of access may be specified by time or date. As an example and not by way of limitation, a user may specify that a particular image uploaded by the user is visible to the user's friends for the next week. As another example and not by way of limitation, a company may post content related to a product release ahead of the official launch, and specify that the content may not be visible to other users until after the product launch. In particular embodiments, access or denial of access may be specified by geographic location. As an example and not by way of limitation, a user may share an object and specify that only users in the same city may access or view the object. As another example and not by way of limitation, a first user may share an object and specify that the object is visible to second users only while the first user is in a particular location. If the first user leaves the particular location, the object may no longer be visible to the second users. As another example and not by way of limitation, a first user may specify that an object is visible only to second users within a threshold distance from the first user. If the first user subsequently changes location, the original second users with access to the object may lose access, while a new group of second users may gain access as they come within the threshold distance of the first user. Although this disclosure describes particular granularities of permitted access or denial of access, this disclosure contemplates any suitable granularities of permitted access or denial of access.

In particular embodiments, one or more servers 162 may be authorization/privacy servers for enforcing privacy settings. In response to a request from a user (or other entity) for a particular object stored in a data store 164, the social-networking system 160 may send a request to the data store 164 for the object. The request may identify the user associated with the request and the object may be sent only to the user (or a client system 130 of the user) if the authorization server determines that the user is authorized to access the object based on the privacy settings associated with the object. If the requesting user is not authorized to access the object, the authorization server may prevent the requested object from being retrieved from the data store 164 or may prevent the requested object from be sent to the user. In the search-query context, an object may be provided as a search result only if the querying user is authorized to access the object, e.g., the privacy settings for the object allow it to be surfaced to, discovered by, or otherwise visible to the querying user. In particular embodiments, an object may represent content that is visible to a user through a newsfeed of the user. As an example and not by way of limitation, one or more objects may be visible to a user's "Trending" page. In particular embodiments, an object may correspond to a particular user. The object may be content associated with the particular user, or may be the particular user's account or information stored on an online social network, or other computing system As an example and not by way of limitation, a first user may view one or more second users of an online social network through a "People You May Know" function of the online social network, or by viewing a list of friends of the first user. As an example and not by way of limitation, a first user may specify that they do not want to see objects associated with a particular second user in their newsfeed or friends list. If the privacy settings for the object do not allow it to be surfaced to, discovered by, or visible to the user, the object may be excluded from the search results. Although this disclosure describes enforcing privacy settings in a particular manner, this disclosure contemplates enforcing privacy settings in any suitable manner.

In particular embodiments, different objects of the same type associated with a user may have different privacy settings. Different types of objects associated with a user may have different types of privacy settings. As an example and not by way of limitation, a first user may specify that the first user's status updates are public, but any images shared by the first user are visible only to the first user's friends on the online social network. As another example and not by way of limitation, a user may specify different privacy settings for different types of entities, such as individual users, friends-of-friends, followers, user groups, or corporate entities. As another example and not by way of limitation, a first user may specify a group of users that may view videos posted by the first user, while keeping the videos from being visible to the first user's employer. In particular embodiments, different privacy settings may be provided for different user groups or user demographics. As an example and not by way of limitation, a first user may specify that other users that attend the same university as the first user may view the first user's pictures, but that other users that are family members of the first user may not view those same pictures.

In particular embodiments, the social-networking system 160 may provide one or more default privacy settings for each object of a particular object-type. A privacy setting for an object that is set to a default may be changed by a user associated with that object. As an example and not by way of limitation, all images posted by a first user may have a default privacy setting of being visible only to friends of the first user and, for a particular image, the first user may change the privacy setting for the image to be visible to friends and friends-of-friends.

In particular embodiments, changes to privacy settings may take effect retroactively, affecting the visibility of objects and content shared prior to the change. As an example and not by way of limitation, a first user may share a first image and specify that the first image is to be public to all other users. At a later time, the first user may specify that any images shared by the first user should be made visible only to a first user group. The social-networking system 160 may determine that this privacy setting also applies to the first image and make the first image visible only to the first user group. In particular embodiments, the change in privacy settings may take effect only going forward. Continuing the example above, if the first user changes privacy settings and then shares a second image, the second image may be visible only to the first user group, but the first image may remain visible to all users. In particular embodiments, in response to a user action to change a privacy setting, the social-networking system 160 may further prompt the user to indicate whether the user wants to apply the changes to the privacy setting retroactively. In particular embodiments, a user change to privacy settings may be a one-off change specific to one object. In particular embodiments, a user change to privacy may be a global change for all objects associated with the user.

In particular embodiments, privacy settings may allow a user to specify whether particular applications or processes may access, store, or use particular objects or information associated with the user. The privacy settings may allow users to opt in or opt out of having objects or information accessed, stored, or used by specific applications or processes. The social-networking system 160 may access such information in order to provide a particular function or service to the user, without the social-networking system 160 having access to that information for any other purposes. Before accessing, storing, or using such objects or information, the social-networking system 160 may prompt the user to provide privacy settings specifying which applications or processes, if any, may access, store, or use the object or information prior to allowing any such action. As an example and not by way of limitation, a first user may transmit a message to a second user via an application related to the online social network (e.g., a messaging app), and may specify privacy settings that such messages should not be stored by the social-networking system 160. As another example and not by way of limitation, social-networking system 160 may have functionalities that may use as inputs personal or biometric information of the user. A user may opt to make use of these functionalities to enhance their experience on the online social network. As an example and not by way of limitation, a user may provide personal or biometric information to the social-networking system 160. The user's privacy settings may specify that such information may be used only for particular processes, such as authentication, and further specify that such information may not be shared with any third-party system 170 or used for other processes or applications associated with the social-networking system 160. As yet another example and not by way of limitation, an online social network may provide functionality for a user to provide voice-print recordings to the online social network. As an example and not by way of limitation, if a user wants to utilize this function of the online social network, the user may provide a voice recording of his or her own voice to provide a status update on the online social network. The recording of the voice-input may be compared to a voice print of the user to determine what words were spoken by the user. The user's privacy setting may specify that such voice recording may be used only for voice-input purposes (e.g., to send voice messages, to improve voice recognition in order to use voice-operated features of the online social network), and further specify that such voice recording may not be shared with any third-party system 170 or used by other processes or applications associated with the social-networking system 160.

In particular embodiments, privacy settings may allow a user to specify whether mood or sentiment information associated with the user may be determined, and whether particular applications or processes may access, store, or use such information. The privacy settings may allow users to opt in or opt out of having mood or sentiment information accessed, stored, or used by specific applications or processes. The social-networking system 160 may predict or determine a mood or sentiment associated with a user based on, for example, inputs provided by the user and interactions with particular objects, such as pages or content viewed by the user, posts or other content uploaded by the user, and interactions with other content of the online social network. In particular embodiments, social-networking system 160 may use a user's previous activities and calculated moods or sentiments to determine a present mood or sentiment. A user who wants to enable this functionality may indicate in their privacy settings that they opt in to social-networking system 160 receiving the inputs necessary to determine the mood or sentiment. As an example and not by way of limitation, social-networking system 160 may determine that a default privacy setting is to not receive any information necessary for determining mood or sentiment until there is an express indication from a user that social-networking system 160 may do so. In particular embodiments, social-networking system 160 may use the predicted mood or sentiment to provide recommendations or advertisements to the user. In particular embodiments, if a user desires to make use of this function for specific purposes or applications, additional privacy settings may be specified by the user to opt in to using the mood or sentiment information for the specific purposes or applications. As an example and not by way of limitation, social-networking system 160 may use the user's mood or sentiment to provide newsfeed items, pages, friends, or advertisements to a user. The user may specify in their privacy settings that social-networking system 160 may determine the user's mood or sentiment. The user may then be asked to provide additional privacy settings to indicate the purposes for which the user's mood or sentiment may be used. The user may indicate that social-networking system 160 may use his or her mood or sentiment to provide newsfeed content and recommend pages, but not for recommending friends or advertisements. Social-networking system 160 may then only provide newsfeed content or pages based on user mood or sentiment, and may not use that information for any other purpose, even if not expressly prohibited by the privacy settings.

In particular embodiments, the social-networking system 160 may temporarily access, store, or use particular objects or information associated with a user in order to facilitate particular actions of the first user, and may subsequently delete the objects or information. As an example and not by way of limitation, a first user may transmit a message to a second user, and the social-networking system 160 may temporarily store the message in a data store 164 until the second user has view or downloaded the message, at which point the social-networking system 160 may delete the message from the data store 164. As another example and not by way of limitation, continuing with the prior example, the message may be stored for a specified period of time (e.g., 2 weeks), after which point the social-networking system 160 may delete the message from the data store 164. In particular embodiments, a user may specify whether particular types of objects or information associated with the user may be accessed, stored, or used by the social-networking system 160. As an example and not by way of limitation, a user may specify that images sent by the user through the social-networking system 160 may not be stored by the social-networking system 160. As another example and not by way of limitation, a first user may specify that messages sent from the first user to a particular second user may not be stored by the social-networking system 160. As yet another example and not by way of limitation, a user may specify that all objects sent via a particular application may be saved by the social-networking system 160.

In particular embodiments, privacy settings may allow a user to specify whether particular objects or information associated with the user may be accessed from particular client systems 130 or third-party systems 170. The privacy settings may allow users to opt in or opt out of having objects or information accessed from a particular device (e.g., the phone book on a user's smart phone), from a particular application (e.g., a messaging app), or from a particular system (e.g., an email server). The social-networking system 160 may provide default privacy settings with respect to each device, system, or application, and/or the user may be prompted to specify a particular privacy setting for each context. As an example and not by way of limitation, a user may utilize a location-services feature of the social-networking system 160 to provide recommendations for restaurants or other places in proximity to the user. The user's default privacy settings may specify that the social-networking system 160 may use location information provided from a client device 130 of the user to provide the location-based services, but that the social-networking system 160 may not store the location information of the user or provide it to any third-party system 170. The user may then update the privacy settings to allow location information to be used by a third-party image-sharing application in order to geo-tag photos.

In particular embodiments, the social-networking system 160 may determine that a first user may want to change one or more privacy settings in response to a trigger action associated with the first user. The trigger action may be any suitable action on the online social network. As an example and not by way of limitation, a trigger action may be a change in the relationship between a first and second user of the online social network (e.g., "un-friending" a user, changing the relationship status between the users). In particular embodiments, upon determining that a trigger action has occurred, the social-networking system 160 may prompt the first user to change the privacy settings regarding the visibility of objects associated with the first user. The prompt may redirect the first user to a workflow process for editing privacy settings with respect to one or more entities associated with the trigger action. The privacy settings associated with the first user may be changed only in response to an explicit input from the first user, and may not be changed without the approval of the first user. As an example and not by way of limitation, the workflow process may include providing the first user with the current privacy settings with respect to the second user or to a group of users (e.g., un-tagging the first user or second user from particular objects, changing the visibility of particular objects with respect to the second user or group of users), and receiving an indication from the first user to change the privacy settings based on any of the methods described herein, or to keep the existing privacy settings.

In particular embodiments, a user may need to provide verification of a privacy setting before allowing the user to perform particular actions on the online social network, or to provide verification before changing a particular privacy setting. When performing particular actions or changing particular privacy setting, a prompt may be presented to the user to remind the user of his or her current privacy settings and asking the user to verify the privacy settings with respect to the particular action. Furthermore, a user may need to provide confirmation, double-confirmation, authentication, or other suitable types of verification before proceeding with the particular action, and the action may not be complete until such verification is provided. As an example and not by way of limitation, a user's default privacy settings may indicate that a person's relationship status is visible to all users (i.e., "public"). However, if the user changes his or her relationship status, the social-networking system 160 may determine that such action may be sensitive and may prompt the user to confirm that his or her relationship status should remain public before proceeding. As another example and not by way of limitation, a user's privacy settings may specify that the user's posts are visible only to friends of the user. However, if the user changes the privacy setting for his or her posts to being public, the social-networking system 160 may prompt the user with a reminder of that the user's current privacy settings of being visible only to friends, and a warning that this change will make all of the users past posts visible to the public. The user may then be required to provide a second verification, input authentication credentials, or provide other types of verification before proceeding with the change in privacy settings. In particular embodiments, a user may need to provide verification of a privacy setting on a periodic basis. A prompt or reminder may be periodically sent to the user based either on time elapsed or a number of user actions. As an example and not by way of limitation, the social-networking system 160 may send a reminder to the user to confirm his or her privacy settings every six months or after every ten photo posts. In particular embodiments, privacy settings may also allow users to control access to the objects or information on a per-request basis. As an example and not by way of limitation, the social-networking system 160 may notify the user whenever a third-party system 170 attempts to access information associated with the user, and require the user to provide verification that access should be allowed before proceeding.

In particular embodiments a client system 130 (e.g., a mobile device) of a first user may launch a video-call session to enable a video stream for display in a small-overlay-window on a display of the client system 130 of the first user. The client system 130 of the first user may receive a video stream comprising video captured at a client system 130 of a second user. The client system 130 of the first user may display the video stream in the small-overlay-window. The small-overlay-window may be positioned over an active application running on the client system 130 of the first user. Displaying video streams in a small-overlay-window (or any subregion smaller than the entire region) may be advantageous to users who need to multitask. A user may be able do other tasks such as composing emails, watching videos, or playing games, while simultaneously engaging in a video-call session. A user may be able to do several of these activities over an extended time period without a break in continuity, in context, or otherwise. As an example and not by way of limitation, a user may be playing a game on the user's client system 130 when a friend initiates a video-call session. In this example, the user may accept the video call from the friend without interruption to the user's game, allowing for a seamless user experience where accepting a call causes minimal interference with the user's current activities. As another example and not by way of limitation, the user may be engaged in a video-call session with a friend and may decide to watch a video suggested by the friend. In this example, the user may launch an application associated with a video-sharing platform and watch the video without any interruption to the ongoing video-call session. The methods described herein may also be useful for users who want to collaborate on an activity or otherwise engage in the activity together. As an example and not by way of limitation, multiple users may be working on a single crossword puzzle together in a crossword-puzzle application. In this example, the users may want to be engaged in a video-call session among themselves while they collaborate on solving the crossword puzzle. As another example and not by way of limitation, multiple users may want to watch a TV show together while being engaged in a video-call session among themselves.

As used herein, the term "communications application" refers to any application that may be used for communications among users, including text, video, or audio communications. As an example and not by way of limitation, a communications application may include a chat or messenger application, a phone application, or another such suitable application. As used herein, the term "call session" refers to any communication between two or more users over their respective client systems involving audio, video, and/or other media. As used herein, the term "video-call session" refers to a call session that includes at least video. While this disclosure focuses on describing the display of video streams during video-call sessions, this disclosure contemplates displaying video streams in other contexts. As an example and not by way of limitation, video streams that may be displayed using the methods of this disclosure may include a stream from a live broadcast. As another example and not by way of limitation, the video streams may include video from a pre-recorded video (e.g., stored on the client system 130 and played using a video-player application) or a video from an online video-sharing platform. As another example, a user may use the described features herein to watch multiple video streams simultaneously on a single client system 130 (e.g., a TV show, a video stream from a camera monitoring the user's baby, a tennis game on a sports channel). Furthermore, while this disclosure focuses on displaying video streams in small-overlay-windows on a display, this disclosure contemplates displaying video streams in any suitable display region on the display.

Figure 3:
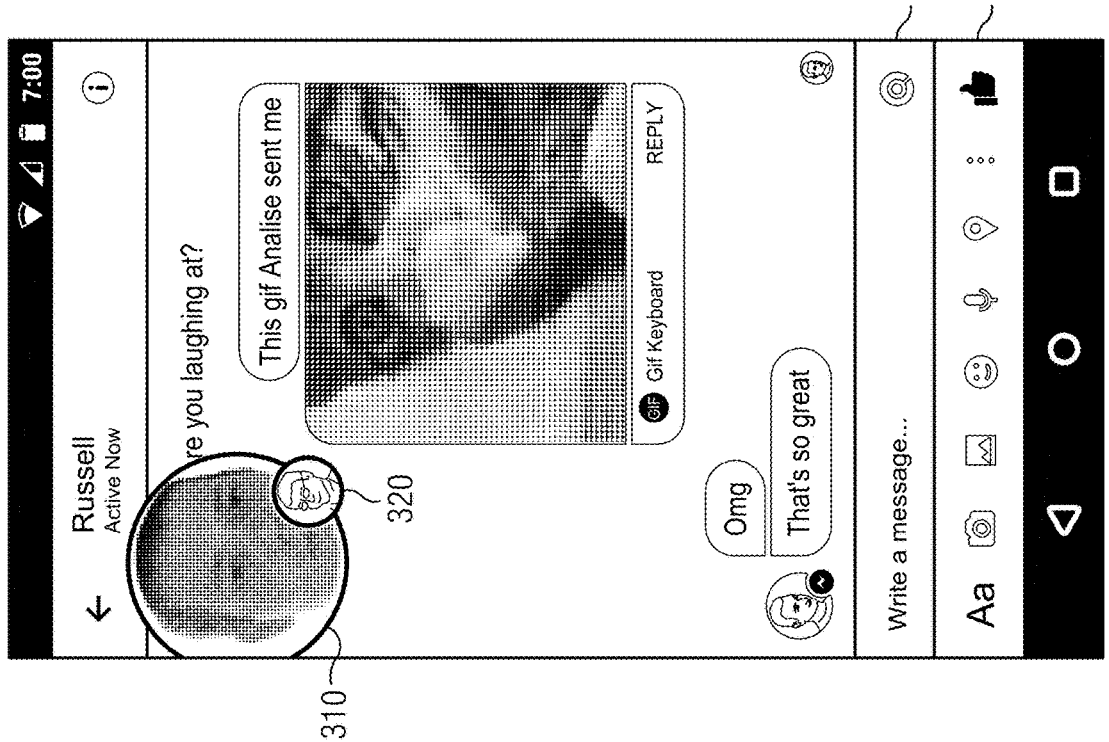
FIG. 3 illustrates a client-system display that includes a video stream within a small-overlay-window.

In particular embodiments, a client system 130 (e.g., a mobile device) of a first user may launch a video-call session to enable a video stream for display in a subregion of a display of the client system 130 of the first user. In particular embodiments, the subregion may be a small-overlay-window. FIG. 3 illustrates a client-system display that includes a video stream within a small-overlay-window 310. The client system 130 of FIG. 3 may be the client system 130 of the first user. In particular embodiments, in the context of the launched video-call session, the first user may be a callee-user (i.e., the first user may have initiated the video-call session) and the second user may be a caller-user, or vice versa (i.e., it may have been the second user who initiated the video-call session). Although this disclosure describes launching particular call sessions to enable a particular media stream for display in a particular display region on a particular system in a particular manner, this disclosure contemplates launching any suitable sessions to enable any suitable media stream for display in any suitable region on any suitable system in any suitable manner.

In particular embodiments, the client system 130 of the first user may receive a video stream from a client system 130 of a second user. The video stream may include video captured at the client system 130 of the second user. As an example and not by way of limitation, FIG. 3 may depict the display of the client system 130 of the first user, which may be receiving a video stream 310 of video captured at the client system 130 of the second user (e.g., the user "Russell"). In particular embodiments, video may be captured at the client system 130 of the first user. This captured video may be sent to the client system 130 of the second user as a video stream. In particular embodiments, the video streams may be sent to and from the client systems 130 directly and without any intermediary. As an example and not by way of limitation, the two client systems 130 may be on a peer-to-peer network that enables the transmission of data directly between them. As another example and not by way of limitation, the two client systems 130 may be connected together via Bluetooth, Local Area Network (LAN), or any other suitable method. In particular embodiments, the video streams may be sent over a network through an intermediary system. As an example and not by way of limitation, the client system 130 of the second user may send a video stream to a server computing machine associated with an application installed on the client system 130 of the first and/or the second user (e.g., a communications application on which the video-call session is established). The server computing machine may subsequently send the video stream to the client system 130 of the first user, such that the video stream is received at the client system 130 of the first user from the server computing machine. The reverse may occur for sending a video stream from the client system 130 of the first user to the client system 130 of the second user. In particular embodiments, the client system 130 of the first may initially receive only a request to accept a video stream, which may need to be accepted by the first user before the video stream itself may be sent. Although this disclosure describes receiving a particular media stream from a particular user in a particular manner, this disclosure contemplates receiving any suitable media stream from any suitable user in any suitable manner.

Figure 4:
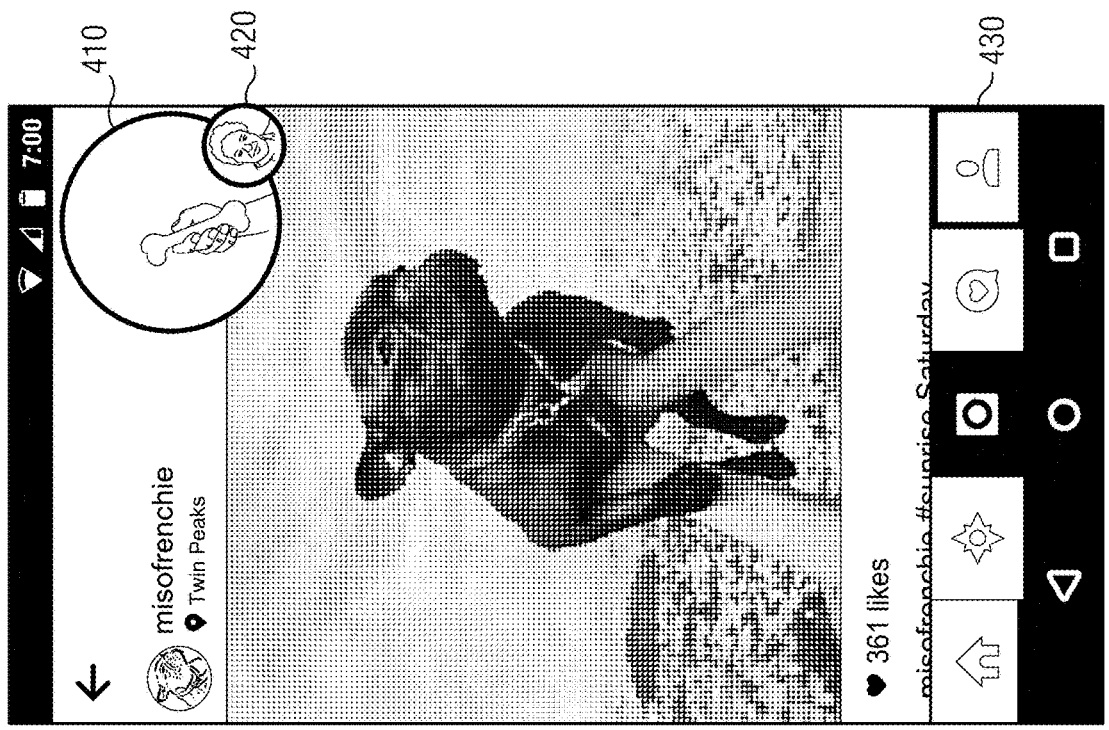
FIG. 4 illustrates a client-system display with a small-overlay-window positioned over an interface of a second application.

In particular embodiments, the client system 130 of the first user may display the video stream in a subregion such as the small-overlay-window 310 in FIG. 3. In particular embodiments, the client system 130 of the first user may receive the video stream but may not display the video stream until it receives an input from the first user confirming that the video stream may be displayed. In particular embodiments, the small-overlay-window may be positioned over an active application running on the client system 130 of the first user. As an example and not by way of limitation, referencing FIG. 3, the small-overlay-window 310 may display the video stream captured at the client system 130 of the second user. In particular embodiments, the operating system of the client system 130 may be able to have two or more applications actively running in the foreground simultaneously, while the video-call session is ongoing. As an example and not by way of limitation, while the video-call session is still established, the first user may launch an interface of a second application (i.e., an application other than the communications application on which the video-call session is established). In this example, the small-overlay-window persists as a small-overlay-window positioned over the interface of the third-party application, continuing to stream the video. FIG. 4 illustrates a client-system display with a small-overlay-window positioned over an interface of a second application. As an example and not by way of limitation, referencing FIG. 4, the second application may be a third-party application associated with an image-sharing social-networking platform. In this example, the second application may be actively running in the foreground simultaneously with the communications application on which the video-call session is established. In particular embodiments, the first user may be able to switch among several applications while the small-overlay-window is displayed in a persistent manner. As an example and not by way of limitation, the first user may have launched the video-call session with only the communications application on the foreground, switched to a second video-player application to view a video, and then switched to a third video-game application to play a video game. In this example, the small-overlay-window may have persisted through all the different interfaces of the different applications. In particular embodiments, the small-overlay-window may be displayed until the client system 130 of the first user receives a user input from the first user for dismissing the small-overlay-window, receives a user input from the first user for terminating the call session, or otherwise has the call session terminated (e.g., if the second user terminated the call, if the connection was lost). In particular embodiments, there may be one or more predefined inputs for dismissing the small-overlay-window. As an example and not by way of limitation, a user input for dismissing the small-overlay-window may be a touch gesture, including, for example, pressing the small-overlay-window and dragging it "off" (e.g., toward the edge of) the screen of the client system 130 of the first user. Upon receipt of a predefined user input dismissing the small-overlay-window, client system 130 may remove small-overlay-window from the display of the client system 130 of the first user. The user input for dismissing the small-overlay window may simply be an input requesting that the video-stream display be suspended while keeping the video-call session alive. Alternatively, it may an input requesting that the associated video-call session be terminated. Each of these user inputs may correspond to specific predefined inputs. As an example and not by way of limitation, the input for simply suspending the video-stream may involve a horizontal swiping gesture, while the input for terminating the video-call session may involve a vertical swiping gesture. Techniques for dismissing elements (which may include small-overlay-windows) are described in further detail in U.S. application Ser. No. 14/099,561, filed 6 Dec. 2013, and U.S. application Ser. No. 14/594,437, filed 12 Jan. 2015, each of which is incorporated herein by reference. Although this disclosure describes displaying a particular media stream in a particular display region in a particular manner, this disclosure contemplates displaying any suitable media stream in any suitable region in any suitable manner.

In particular embodiments, the small-overlay-window may have a default position, size, or shape (which may also include the shape of a frame of the small-overlay window). In particular embodiments, the defaults may be determined based on a relationship between the first user and the second user. As an example and not by way of limitation, in the case where the second user is the spouse of the first user, the default shape for the respective small-overlay-window may be the shape of a heart or another suitable shape recognizing the existing relationship. As another example and not by way of limitation, in the case where the second user is a coworker of the first user, the default shape may be the shape of a briefcase. In these examples, the relationship may be determined based on social-graph information retrieved from a social graph of the social-networking system 160. In particular embodiments, the defaults may be based on a preference of the second user, generally. As an example and not by way of limitation, the second user may have expressed a user preference for pandas (e.g., explicitly indicating so in the user's profile information, belonging to a panda-conservation group, "liking" a number of posts about pandas on the online social network), in which case a default small-overlay-window may be a circle showing the video stream (as in FIG. 3), but within a frame in the form of a panda. The user preference may be stored as social-graph information on the social-networking system 160, or in a user preference file, generally (e.g., on a server associated with a communications application, on the client system 130 of the first user, on the client system 130 of the second user, on another client system 130 associated with the second user). Similarly, in particular embodiments, the defaults may be based on a preference the first user. The user preference may be stored as social-graph information on the social-networking system 160, or in a user preference file, generally (e.g., on a server associated with a communications application, on the client system 130 of the first user, on the client system 130 of the second user, on another client system 130 associated with the first user). In particular embodiments, the defaults may be based on a history of usage of other small-overlay-windows by the first user. As an example and not by way of limitation, if the first user frequently positions small-overlay-windows in past video-call sessions at a position represented by coordinates (x, y) (e.g., a majority of the time, more frequently than any other position), the default position may be at (x, y). As another example and not by way of limitation, if the first user positioned the small-overlay-window at (x, y) in the most recent video-call session, the default position may be at (x, y). In this example, the default position may be updated after every use of the small-overlay-window to mirror the most recent usage. The history of usage may be based on usage data from multiple client systems 130 that are associated with the first user. As an example and not by way of limitation, the first user may have used small-overlay-windows during video-call sessions on a laptop, a work phone, and a personal phone. In this example, usage data may be collected from all three devices to determine a history of usage for the first user. In particular embodiments, the defaults may be based on a style or theme associated with the active application over which the small-overlay-window is displayed. As an example and not by way of limitation, the first user may be playing a video game associated with the TV Show and movie franchise Star Trek, in which case, the small-overlay-window may default to a Star Trek theme (e.g., it may be in the shape of the fictional starship USS Enterprise). In particular embodiments, the defaults may be based on a user interface of the active application over which the small-overlay-window is positioned. Certain positions, sizes, or shapes may be more optimal for particular user interfaces. As an example and not by way of limitation, if the active application is a video-player application, a small-overlay-window may be of a smaller size (e.g., to allow the first user to have a less-obstructed view of the video) than if the active application is a music-player (e.g., in which case, the user may not mind as much if the view is obstructed). As another example and not by way of limitation, for a communications application (e.g., the communications application being used to facilitate the current video-call session), the default position of the small-overlay-window may be away from the bottom, where the latest chat messages may be displayed, or where there may be user-input fields (e.g., a text field where characters for a new chat message may be entered). As yet another example and not by way of limitation, for a newsreader application, the default position of the small-overlay-window may be away from areas that users generally tend to focus on when reading news articles. In this example, the default position may be in a bottom corner of the screen. Relatedly, in particular embodiments, the defaults may be based on the specific content being displayed in the active application over which the small-overlay-window is positioned. As an example and not by way of limitation, the default position, size, and/or shape of the small-overlay-window may be such that the content is not obscured or such that a minimal amount of content is obscured. The defaults may be such that the small-overlay-window covers only marginal or fringe areas of certain types of content (e.g., photographs, text in an article) on the display. As an example and not by way of limitation, referencing FIG. 4, the small-overlay window 410 may have been positioned and sized by default to cover only a small fringe area of the photograph being viewed in the display. In particular embodiments, the defaults may be based on the size or shape of the display, which may be limited by the hardware of the client system 130 (e.g., the size of its screen, a display-resolution limitation). As an example and not by way of limitation, the default shape of a screen that is circular may tend toward a circular shape. As another example and not by way of limitation, a client system 130 with a relatively small screen size may default to a small-overlay-window that is smaller in size than what would have been the default in a client system 130 with a larger screen size. In particular embodiments, the client system 130 may display a first-user-small-overlay-window that includes a video stream captured at the client system 130 of the first user. In particular embodiments, the first-user-small-overlay-window may be displayed concurrently with the small-overlay-window. As an example and not by way of limitation, referencing FIG. 3, the first-user-small-overlay-window 320 is displayed along with the small-overlay-window 310. The first-user-small-overlay-window may be of a different size and shape than the small-overlay-window. As an example and not by way of limitation, as illustrated in FIG. 3, the first-user-small-overlay-window may be smaller than the small-overlay-window. The first-user-small-overlay-window may be located in any suitable location on the display of the client system 130. As an example and not by way of limitation, as illustrated in FIG. 3, the first-user-small-overlay-window 320 may overlay a portion of the small-overlay-window 310. As another example and not by way of limitation, the first-user-small-overlay-window may be adjacent to or near the small-overlay-window. In particular embodiments, the first-user-small-overlay-window may be free-floating and may be re-positioned, resized, or reshaped, in the same ways as the small-overlay-window can be positioned, resized, or reshaped, as described above. In particular embodiments, the first-user-small-overlay-window may itself have a default position, size, or shape, determined based on the same factors as the small-overlay-window, as described above.

In particular embodiments, the small-overlay-window (or the first-user-small-overlay-window) may be altered in any suitable manner. As an example and not by way of limitation, it may be re-positioned, resized, or reshaped at any time during the video-call session. The small-overlay-window may be altered in response to a corresponding input by the first user. As an example and not by way of limitation, referencing FIG. 3, the first user may manually re-position the small-overlay-window 310, which may be at a position (which may be represented by the coordinates (x, y)) to a new position (which may be represented by the coordinates (x', y')) on the bottom-right of the screen by dragging it to the new position (e.g., using a finger on a touch-screen, using a mouse and cursor). As another example and not by way of limitation, the first user may resize the small-overlay-window with an appropriate gesture (e.g., spreading two fingers in opposite directions on a touch-screen, using a cursor to drag the boundaries of the small-overlay-window). As another example and not by way of limitation, the first user may select among different shapes (e.g., from a drop-down menu). In particular embodiments, the small-overlay-window (and/or the first-user-small-overlay-window) may be altered automatically during a video-call session, without a user input. The automatic-alteration may occur so as to not obscure "focal-regions" or other important areas of an interface the first user is viewing. Focal-regions may include areas of the interface of an active application displaying the content being viewed by the first user (e.g., the name of a second user "Russell" in FIG. 3, the photograph in FIG. 4, text of an article that the user may be reading, video display areas), input areas (e.g., form input fields such as the input-field 330 in FIG. 3, the interactive elements within the input-bar 340), scrolling areas (e.g., a scrolling Rich Site Summary (RSS) feed), banner advertisements, or other such areas. Focal-regions may be further determined based on a predictive-algorithm that calculates the probability of the first user being interested in a particular region at a given time. The altering of the small-overlay-window may also account for differing levels of user interest for regions within focal-regions. If a portion of a focal-region has to be obscured, the less-interesting portions may be obscured while the more-interesting portions are left unobscured. As an example and not by way of limitation, referencing FIG. 3, the predictive-algorithm may determine that the most recent text messages (e.g., "Omg," "That's so great") would be more interesting to the first user than previous text messages (e.g., ". . . re you laughing at?"). As a result, in this example, the small-overlay-window 310 (and the first-user-small-overlay-window 320) may obscure the latter rather than the former. As another example and not by way of limitation, the predictive-algorithm may determine that a particular input area is more interesting to a user than a different input area. For example, an input area in which a user input was recently received may be determined to be more interesting to the first user than an input area in which a user input was not as recently received (e.g., where the first user is composing an email in an email application, the input area where the last word was entered may be of higher interest to the user than an input area where the a previous word was entered). In particular embodiments, the alteration of the small-overlay-window may be performed at a computer server machine that mediates the video-call session (e.g., a computer server machine associated with a communications application). Alternatively or additionally, the alteration of the small-overlay-window may be performed at the client system 130 of the first user, or the client system 130 of the second user. Any suitable visual effects may be used to show the alteration of the small-overlay-window. As an example and not by way of limitation, re-positioning, re-sizing, or re-shaping the small-overlay-window may cause it to disappear and subsequently re-appear as a small-overlay-window in the new position, size, or shape. As another example and not by way of limitation, an animation may be used to show the transition (e.g., when re-positioning with a dragging gesture, the small-overlay-window may appear to move along with the dragging gesture). As another example and not by way of limitation, visual special effects may be used to show the transition (e.g., the small-overlay-window become translucent as it is re-sized, the small-overlay-window leaving a trail of sparks as it is re-positioned). As another example and not by way of limitation, a physics engine may be used to simulate spring movement or other suitable physics-related animations or behaviors of the small-overlay-window as it is being altered. In this example, for simulating spring movement, one or more virtual "springs" may be attached to the small-overlay-window (e.g., between the origin position of the small-overlay-window and the small-overlay-window itself), and the physics engine may use a version of Hooke's law (F=−kx, where x is the displacement of the small-overlay-window from its origin position and k is a spring constant that may be defined by the physics engine). The physics engine may implement algorithms that consider any suitable variables such as tension, mass, and damping effect. More information about using a physics engine to simulate spring movement may be found in U.S. application Ser. No. 13/846,131, filed 18 Mar. 2013, and U.S. application Ser. No. 14/099,535, filed 6 Dec. 2013, each of which is incorporated herein by reference. In particular embodiments, some or all of the qualities of the small-overlay-window may be immutable or may otherwise not be easily altered. As an example and not by way of limitation, referencing FIG. 3, the small-overlay-window 310 and the first-user-small-overlay-window 320 may be in a fixed position, size, or shape.

In particular embodiments, the small-overlay-window may be generated and displayed while the first user is viewing an interface other than one of the application that generates the small-overlay-window (e.g., a communications application). As an example and not by way of limitation, the first user may be playing a game on a video-game application when a video-call session may be initiated by the second user, in response to which a video stream from the second user may be displayed in a small-overlay-window positioned over the video-game application. The small-overlay-window may be generated and displayed without leaving the context of the active application (e.g., a video game being played). It may function and be displayed independent of activity of the active application or any input the first user performs with respect to the application, such that the first user may interact with the active application normally. As an example and not by way of limitation, referencing FIG. 4, the small-overlay-window 410 (and the first-user-small-overlay-window 420) may be displayed independent of any inputs (e.g., activating the interactive element 430) the first user performs within the application (e.g., an application associated with an image-sharing social-networking platform). As another example and not by way of limitation, again referencing FIG. 4, the first user may scroll through the content on the application without it affecting the function and display of the small-overlay-window 410. The small-overlay-window may persist in the portion of a display of the client system 130 (e.g., a corner of the display) until dismissed (e.g., by a first-user input dismissing the small-overlay-window, upon termination of the call by the second user). When the small-overlay-window is dismissed, the active application may continue to operate normally and without interruption. More on the display and behavior of elements such as small-overlay-windows overlaying active applications may be found in U.S. patent application Ser. No. 14/594,437, filed 12 Jan. 2015, and U.S. patent application Ser. No. 13/685,431, filed 26 Nov. 2012, each of which is incorporated herein by reference.

In particular embodiments, the video streams that are sent or received by either of the client systems 130 may be of any suitable resolution. As an example and not by way of limitation, the video stream received at the client system 130 of the first user may be a low-resolution version or a high-resolution version (which, as used herein, are relative terms) of the video captured at the client system 130 of the second user. In particular embodiments, there may be a default resolution. As an example and not by way of limitation, the video stream may always default to low-resolution version. In particular embodiments, the default version may be determined by a history of past video-call sessions. As an example and not by way of limitation, if the first user and second user frequently elect to send and receive low-resolution video streams when they engage in video-call sessions (e.g., exceeding a threshold ratio of low-resolution to high-resolution video streams), the video streams for both client systems 130 may be configured to send and receive low-resolution versions by default when they engage in a video-call session. As another example and not by way of limitation, the current resolution of the client device 130 of the first user may default to the resolution that was received by the client device 130 of the first user in the most recent video-call session, or the most recent video-call session with the current second user. In particular embodiments, a client system 130 receiving a video stream may, at any time during the video-call session, request a different version. As an example, the client system 130 of the first user that is receiving and displaying a low-resolution version of a video stream may receive an input from the first user for a high-resolution version. A user input may include a suitable gesture (e.g., on a touch-screen, touching a location corresponding to a display of a video stream in a small-overlay-window with two fingers and spreading them apart) or may involve a selection of an option among different options (e.g., right-clicking on a location corresponding to a display of a video stream in a small-overlay-window and selecting an option to expand it to a larger region of the display). As another example and not by way of limitation, when a client system 130 does not have sufficient bandwidth, it may automatically request or send a low-resolution version. In particular embodiments, in response to the request from the client system 130 receiving the video stream, the client system 130 sending the video stream may send a high-resolution version to the client system 130. In particular embodiments, if there is a computer server machine mediating the video-call session (e.g., one that is associated with a communications application that is being used for the video-call session), the computer server machine may always have the high-resolution version (i.e., client systems 130 sending the video stream may always send high-resolution versions to the computer server machine). In such cases, the computer server machine may determine what version to relay to the client system 130 receiving the video stream, such that the request would be directed to the computer server machine and not to the client system 130 sending the video stream. In particular embodiments, the version that is sent to the client system 130 of a user may be of the same type as the video stream that is sent from the client system 130 of the user (i.e., the client systems 130 may be configured to reciprocate). As an example and not by way of limitation, if during a video-call session, the client system 130 of the first user requests and receives a higher-resolution version of the video from the client system 130 of the second user, the client system 130 of the first user may reciprocate by sending, to the client system 130 of the second user, a higher-resolution of the video captured at the client system 130 of the first user.

Figure 5B:
FIGS. 5A and 5B illustrate, respectively, a display of a video stream in a small-overlay-window, and a display of a video stream in a full-screen display.
Figure 5A:
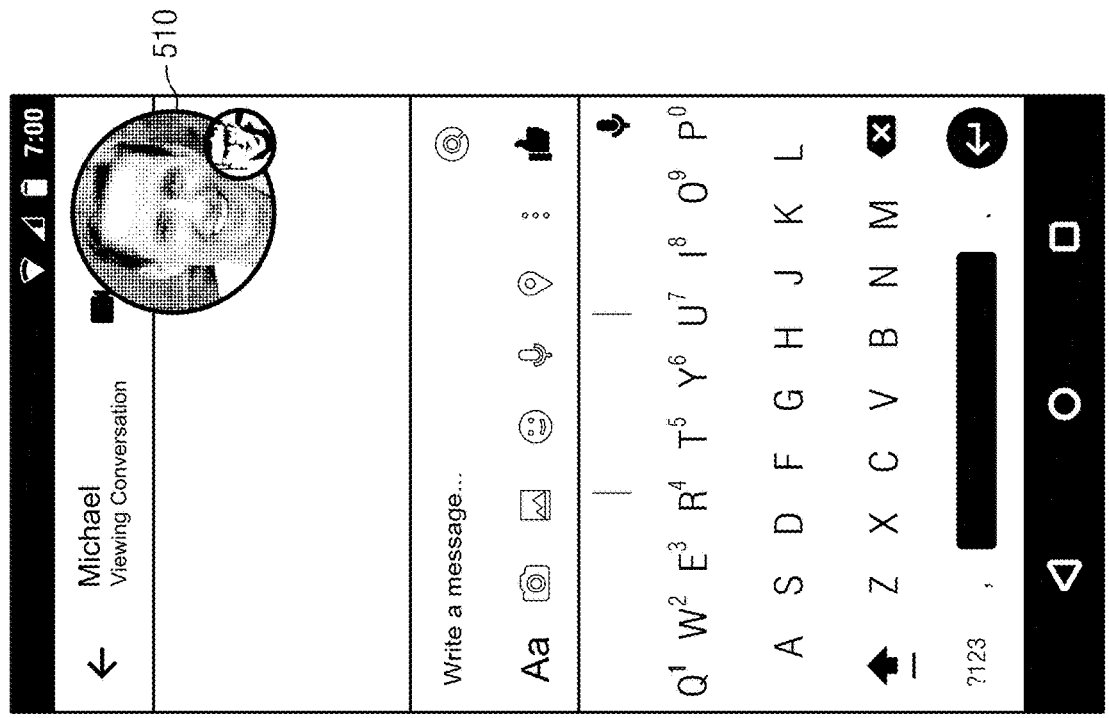

In particular embodiments, the video streams that are sent or received by either of the client systems 130 may be displayed within a region larger than a small-overlay-window (e.g., as a full-screen display). FIGS. 5A and 5B illustrate, respectively, a display of a video stream in a small-overlay-window 510, and a display of a video stream in a full-screen display. In particular embodiments, the version of the video that is received may correspond to the size of the region in which the video stream is displayed. As an example and not by way of limitation, a video stream displayed in a small-overlay-window may be of a low resolution, while a video stream displayed within a larger region of the display may be of a high resolution. As another example and not by way of limitation, a video stream displayed in a small-overlay-window that is of a relatively small size may be of a low resolution, while a video stream displayed in a small-overlay-window that is of a relatively large size may be of a high resolution. When a video-call session is launched, the display of the video stream may default to being displayed in either a small-overlay window or a larger region of the display. The type of display to which a video-stream defaults may be based on the same or similar factors used to determine the resolution of the video stream (described above). As an example and not by way of limitation, the default may be determined by a history of past video-call sessions. Just as is the case with video resolutions, a client system 130 may at any time during the video-call session request a different type of display. As an example and not by way of limitation, referencing FIGS. 5A and 5B, the client system 130 of the first user (e.g., a user of the communication system 803, the social-networking system 160, the communications application) may have requested a larger display (e.g., in response to a user input, as described above), so that the video stream displayed in the small-overlay-window 510 in FIG. 5A is displayed as a full-screen display, as illustrated in FIG. 5B. In this example, the first-user-small-overlay-window too may be displayed within a larger region of the display, as illustrated in FIG. 5B. The reverse may occur with a similar request from the client system 130 of the first user for a smaller display (e.g., referencing FIG. 5A, resulting in the display of the video stream in the small-overlay-window 510). In particular embodiments, the switch between the small-overlay-window display and the larger-region display may occur locally without the client system 130 having to send a request for a smaller or larger display. In such a case, the same video stream data may be used to display the video stream in the desired display region. As an example and not by way of limitation, in the middle of a video-call session, a first user viewing a video stream in a small-overlay-window may submit a user input (e.g., using the same or similar inputs described above in the context of switching between different video resolutions) as for a larger display, and the client system 130 of the first user may locally cause the video stream to be displayed in a display region larger than the small-overlay-window. In this example, the client system 130 of the first user may simply enlarge the video stream currently being displayed in the small-overlay-window. Any portion of the video stream that was previously cropped to fit in the small-overlay-window may be displayed in the larger display region if it is determined that such a display is optimal given the larger display region.

In particular embodiments, the video stream may be a cropped version of the video captured at the client system 130 sending the video stream (e.g., the client system 130 of the first user). In particular embodiments, the cropped version may include images from the video (i.e., the sequence of images that make up the video) captured at the client system 130 of the second user cropped using an object-tracking feature, the object-tracking feature cropping the images to fit within a threshold distance of a focal point. As an example and not by way of limitation, if the video stream needs to be displayed in a small-overlay-window that is in the shape of a square, the video may be cropped into a square that fits within a threshold distance from a focal point (which may be described geometrically as a circle). The threshold distance may be a function of the size and shape of the region in which the video stream is displayed (e.g., the small-overlay-window). As an example and not by way of limitation, there may be a higher threshold distance for a larger region of the display than a smaller region of the display. The focal point may be a point in the images that is of interest to the user. As an example and not by way of limitation, the focal point may be a face, a family pet, a moving object, an object that is currently in focus, or any other suitable object that may be of interest to the user. In particular embodiments, the object-tracking feature may further recognize different objects in the images, rank the different object based on their respective identities, and determine the focal point based on their ranks (e.g., selecting the highest-ranked object as the focal point). As an example and not by way of limitation, an object that is recognized to be a human face may be ranked higher than an object that is recognized to be a chair. Additional factors, such as proximity to a location on the image, may influence the rankings. As an example and not by way of limitation, a face that is far from the center of an image may be ranked lower than a face that is closer to the center of the image (or even a chair that is closer to the center of the image). More information about recognizing objects in images may be found in U.S. application Ser. No. 13/959,446, filed 5 Aug. 2013, and U.S. application Ser. No. 14/983,385, filed 29 Dec. 2015, each of which is incorporated herein by reference. In particular embodiments, the cropped version may not use an object-tracking feature and may simply set the focal point to be at a pre-determined location in the images (e.g., the center of the images). The cropping of the video stream may be performed either at the client system 130 sending the video (e.g., the client system 130 of the second user), or at a computer server machine mediating the video-call session (if one exists). In particular embodiments, cropping may only be performed when a video stream needs to be displayed in a small-overlay window.

In particular embodiments, multiple video streams from client systems 130 of multiple second users may be received and displayed simultaneously on the client system 130 of the first user. As an example and not by way of limitation, the first user may be engaged in a group chat including multiple users. As another example and not by way of limitation, the first user may be engaged in multiple unrelated video-call sessions (e.g., the first user many be receiving a silent-video stream from a spouse while verbally conversing over a video call with a coworker). The video streams may be displayed within multiple small-overlay-windows, multiple larger display regions, or any combination thereof. As an example and not by way of limitation, a video stream from one second user may be displayed as a full-screen display, and a video stream from another second user may be displayed within a small-overlay-window. In particular embodiments, each small-overlay-window or larger display region may have unique default positions, sizes, and/or shapes (which may be determined based on the factors described above). As an example and not by way of limitation, a small-overlay-window with a video stream from the first user's spouse may be in the shape of a heart, while a small-overlay-window with a video stream from the first user's coworker may be in the shape of a briefcase. In particular embodiments, when there are multiple video streams being displayed, the display region (e.g., the small-overlay-window) associated with a dominant speaker (e.g., a second user who is currently speaking) may be distinguished from the other display regions in any suitable manner. As an example and not by way of limitation, a small-overlay-window associated with a dominant speaker may be temporarily enlarged, may be highlighted with a particular color, or may otherwise be visually made distinguishable from other display regions being displayed.

In particular embodiments, a communication system 803 may determine an occurrence of a trigger event indicating availability of a callee-user for a call session with a caller-user. The communication system 803 may be the social-networking system 160 or may be associated with the social-networking system 160. Alternatively, the communication system 803 may be a system that is separate from the social-networking system 160. In this case, the communication system 803 may receive information from the social-networking system 160 (e.g., social graph information), which it may use as described below (e.g., in determining the occurrence of a trigger event). The communication system 803 may interface with one or more client systems 130 (e.g., the client system 130 of the first user and the client system 130 of the second user) to facilitate the communications described herein, As an example and not by way of limitation, this interface may be facilitated by the communications application described herein. In particular embodiments, the communication system 803 may send a notification to a client system 130 of the caller-user indicating an availability of the callee-user to participate in the call session. The notification may only be sent if there is a threshold level of certainty that the callee-user is available, which may include consideration of one or more negative or positive conditions. The communication system 803 may receive a request from the client system 130 of the caller-user to initiate the call session. The communication system 803 may establish the call session to enable a media stream comprising media captured at the client system 130 of the caller-user to be received at the client system 130 of the callee-user. The communication system 803 may send the media captured at the client system 130 of the caller-user to the client system 130 of the callee-user. A goal of the disclosed method is to encourage the use of media communications, particularly with the use of call sessions. One way it does so is by making the experience of setting up a session smoother and more instantaneous. Almost immediately after a caller-user requests a call session, the callee-user is presented with media from the caller-user. With minimal effort, the callee-user may choose to send back media. The result is a disruption of the traditional, cumbersome model of requesting a call, waiting for the call to be accepted, and finally sending media once the call is accepted. Another way the disclosed method may encourage the use of media communications is by promoting the call session functionality to a caller-user at the right time (e.g., when the callee-user is available or interested in a call session), thereby increasing the chance that a request for a call session will be received favorably and likely resulting in a positive call session experience. Over time, having such positive experiences with call sessions may encourage users to make more use of call sessions. Promoting the call session functionality at the right time also serves to reinforce the smoothness and instantaneousness of the experience, because it ensures that the caller-user is rarely refused or left waiting (e.g., a user who is available will be much more likely to respond quickly). The caller-user experiences a much quicker connection with the callee-user, without much uncertainty about whether the other user will refuse the call.

As used herein, the term "caller-user" refers to a user (e.g., of the social-networking system 160 and/or the communication system 803, of a communications application used to facilitate a respective call session) who requests or potentially may request a call session with at least one other user. As used herein, the term "callee-user" refers to a user who receives or potentially may receive the request to join a call session with at least the caller-user. Although this disclosure focuses on call sessions between two client systems 130, one of a caller-user and one of a callee-user, any number of client systems 130 may be involved in the call session. As an example and not by way of limitation, a client system 130 of a caller-user may initiate a call session with two client systems 130 of two callee-users.

In particular embodiments, the communication system 803 may determine an occurrence of a trigger event indicating availability of a callee-user for a call session with a caller-user. Availability of a callee-user may suggest that the callee-user is likely to be available for or interested in a call session generally, or in a call session with the particular caller-user. Availability information may also be specific to a type of call session (e.g., the media type that is to be sent and/or received during the call session). As an example and not by way of limitation, a callee-user may be available for a call session that includes video, but may not be available for a call session that also includes audio. In particular embodiments, availability may be quantified in what may be referred to as an availability-score. A higher availability-score for a callee-user generally may indicate a higher likelihood that the callee-user is available or interested. A trigger event may be an event or status that functions as an indicator of availability. In particular embodiments, a trigger event may include an occurrence of a state where the caller-user and the callee-user are on a shared chat thread of a messaging application (e.g., a messaging application that may facilitate the call session). The trigger event may occur when either or both of the users send one or more messages to each other on the chat thread. This may be an indicator that the callee-user is available or interested in talking to the caller-user (e.g., the very fact that the callee-user is taking the time to chat with the caller-user suggests that the callee-user has the time or interest to converse with the caller-user). In particular embodiments, the trigger event may include an occurrence where the callee-user has opened up an interface that may be used to send a message to the caller-user. This may be an indicator that the callee-user is at least thinking about communicating with the caller-user. In particular embodiments, the trigger event may include an occurrence where the callee-user is on a page or interface associated with the caller-user. As an example and not by way of limitation, the callee-user may have been on a profile page of the caller-user (e.g., on the online social network, on a third-party website). As another example and not by way of limitation, the callee-user may have been looking at a photograph of the caller-user (e.g., on the online social network, on a third-party website). In particular embodiments, a trigger event may include an occurrence where the callee-user has acted in manner indicating a threshold amount of interest in the callee-user. As an example and not by way of limitation, a trigger event may have occurred if the callee-user has been browsing a page or interface associated with the caller-user for a threshold amount of time. As another example and not by way of limitation, a trigger event may have occurred if the callee-user has performed a threshold number of actions associated with the caller-user (e.g., having viewed a threshold number of pictures within a period of time, having liked a threshold number of posts within a period of time). Although this disclosure describes determining a particular occurrence indicating a particular state of a particular user in a particular manner, this disclosure contemplates determining any suitable occurrence indicating any suitable state of any suitable user in any suitable manner.

Figure 6C:
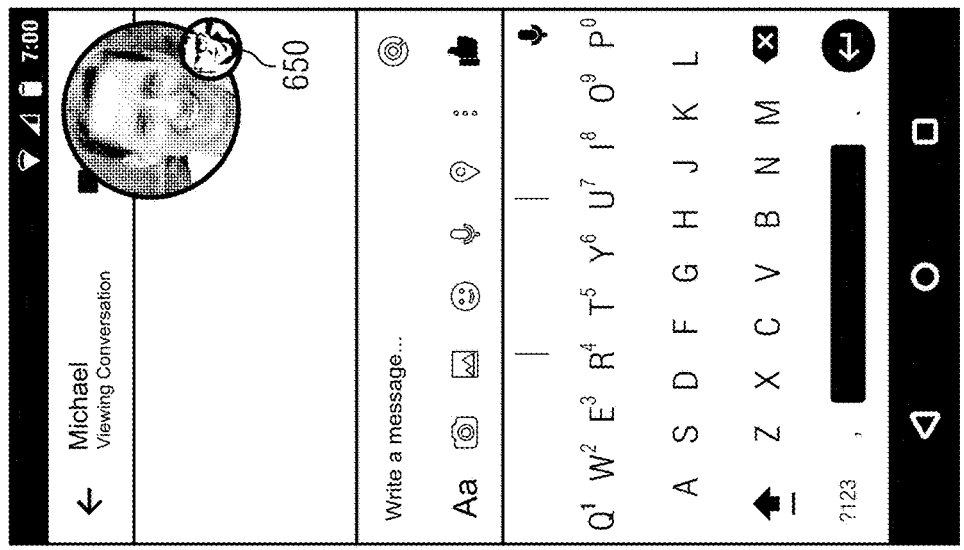
FIG. 6C illustrates a display of a callee-user's client system 130 following a reply-input from the callee-user requesting that media be sent to the caller-user.
Figure 6B:
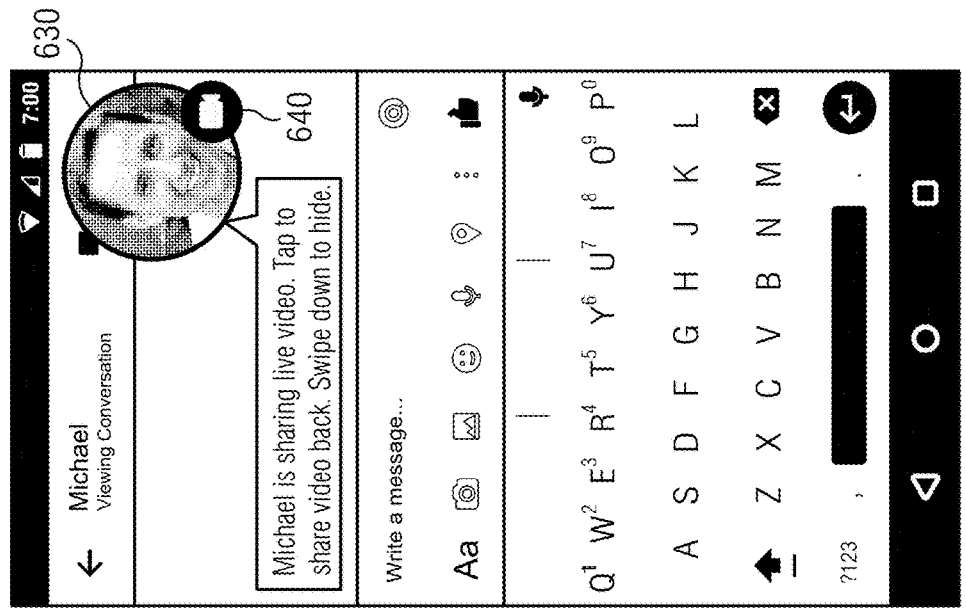
FIG. 6B illustrates a display of a callee-user's client system that includes a video stream from the caller-user.
Figure 6A:
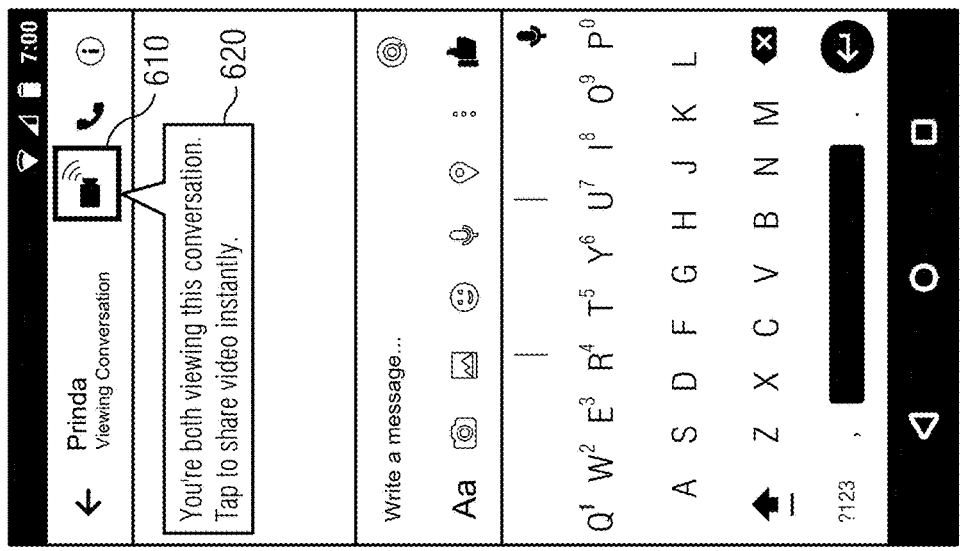
FIG. 6A illustrates a notification on a display of a caller-user's client system indicating an availability of a callee-user.
Figure 7:
FIG. 7 illustrates notifications being displayed indicating the availability of three callee-users.

In particular embodiments, the communication system 803 may send a notification to a client system 130 of the caller-user indicating an availability of the callee-user to participate in the call session. A notification may be any suitable visual, auditory, or other cue that may indicate to the caller-user that the callee-user is available. FIG. 6A illustrates a notification on a display of a caller-user's client system 130 indicating an availability of a callee-user. In particular embodiments, the communication system 803 may determine whether or not to send the notification. The notification may be sent in response to the occurrence of a trigger event. As an example and not by way of limitation, referencing FIG. 6A, the caller-user and the callee-user may have been communicating to each other on a shared chat thread of a messaging application. In this example, the messaging application may notify the caller-user by animating the video-call interactive element 610, animating an audio-call icon, sending the textual notification 620, and/or any other suitable notification. In particular embodiments, the notifications may be displayed outside the confines of an interface limited to a particular user or a particular group of users. FIG. 7 illustrates notifications being displayed indicating the availability of three callee-users. As an example and not by way of limitation, referencing FIG. 7, a notification 720 may be displayed next to a representation of the callee-user 710 (e.g., a user named "Ike"), indicating to the caller-user that the callee-user is available. In this example, the notification may be an animation, or may simply be an image. The notification may only be sent to the client system 130 of the caller-user if the availability-score associated with the callee-user exceeds a threshold value, which may be an indication that there is a threshold level of certainty that the callee-user is available. Although this disclosure describes sending a particular notification to a particular user in a particular manner, this disclosure contemplates sending any suitable notification to any suitable user in any suitable manner.

In particular embodiments, the communication system 803 may calculate the availability-score of a callee-user based on the occurrence of one or more trigger events and further based on the occurrence of one or more negative conditions. The occurrence of a negative condition may serve to counteract the occurrence of a trigger event, in that a negative condition may be an indication that a user is not available or interested in a particular call session. The occurrence of a negative condition may decrease the availability-score of a callee-user. The communication system 803 may access information (e.g., social graph information from its own data stores 164, received from the social-networking system 160 if the communication system 803 is a separate system, received from the client system 130 of the callee-user, received from a third-party system) corresponding to an occurrence of a negative condition. In particular embodiments, information corresponding to an occurrence of a negative condition may include geo-location information associated with the client system 130 of the callee-user. The geo-location information may correspond to a geo-location that may in some way be unsuitable or undesirable for a call session. In particular embodiments, information corresponding to an occurrence of a negative condition may include information about a schedule of the callee-user, which may be determined in any suitable manner. As an example and not by way of limitation, the communication system 803 may receive information from a calendar application on the client system 130 of the callee-user, within which the callee-user may have scheduled a time particular time-slot for a business meeting. In this example, if the current time is within the particular time-slot, the communication system 803 may determine that the negative condition occurred. As another example and not by way of limitation, the callee-user may have uploaded a calendar of events to the communication system 803 or the social-networking system 160, and this calendar of events may be accessed for the same purpose as the previous example. As another example and not by way of limitation, the callee-user may have accepted an invitation to a study-group event, scheduled for a particular time-slot, through the online social network. In this example, the communication system 803 may interpret this information about the callee-user as a negative condition during the particular time-slot (e.g., because a callee-user may be less interested in a call session while at a study group).

In particular embodiments, information corresponding to an occurrence of a negative condition may include information about a relationship between the callee-user and the caller-user. As an example and not by way of limitation, if a callee-user who has indicated an aversion to a particular caller-user in the past, the communication system 803 may interpret that as a negative condition. In particular embodiments, information corresponding to an occurrence of a negative condition may include information about a level of interaction between the callee-user and the caller-user. As an example and not by way of limitation, if a callee-user is a person who has limited interaction with the caller-user (e.g., on the online social network), that may ordinarily be a negative condition, because it is conceivable that the callee-user may not be interested in the caller-user. On the other hand, it may not be a negative condition in some cases, because a video-call session between a callee-user may find a caller-user interesting specifically because of the fact that they have not interacted frequently (e.g., because they may have more to converse about). In particular embodiments, information corresponding to an occurrence of a negative condition may include information about the degree of separation between the callee-user and the caller-user on the online social network. As an example and not by way of limitation, the communication system 803 may access the social graph (e.g., through the social-networking system 160 if it is a separate system, directly if it is the same system) to determine how many degrees of separation there are between a node representing the callee-user and a node representing the caller-user. In this example, if there is more than a maximum degree of separation (e.g., more than one), the communication system 803 may interpret that as a negative condition.

In particular embodiments, information corresponding to an occurrence of a negative condition may include a user preference of the callee-user indicating that the callee-user is not interested in a call session with a caller-user. The user preference may be derived based on information about the callee-user, which may be included in social-networking information associated with the callee-user. This information may include demographics, memberships in particular groups (e.g., on the online social network), hobbies of the user, or any other suitable information. As an example and not by way of limitation, if the callee-user is a seventeen-year-old user, that may be a negative condition for a caller-user who is nine (e.g., because a teenager may not be interested in speaking to a nine-year-old). As another example and not by way of limitation, the callee-user may have expressed (either explicitly or implicitly through a history of the callee-user's behaviors) a preference to not accept call sessions from family members, a member of a particular political party, or any other suitable group. As another example and not by way of limitation, the callee-user may have indicated a severe hearing problem, such that a negative condition may be found (e.g., because a call session may not be preferred by the callee-user due to the hearing problem). The user preference may also be derived based on concepts or users to which the callee-user is associated, as determined by whether their respective nodes are connected, directly or indirectly, on the social graph. A callee-user may be associated with a concept or user if the callee-user interacts with the concepts or users (e.g., liking a concept or user, posting about the concept or user, commenting on posts associated with the concept or user, being a member of a group related to the concept or user). As an example and not by way of limitation, a callee-user may be determined to have a dislike for cat owners based on the callee-user being a member of a group that has a stated purpose of eliminating cat videos from the internet. In this example, for a caller-user who is a cat owner (as may be determined by, for example, the user's profile information, the user's photos that may have tagged one or more cats), the communication system 803 may determine that there is a negative condition. User-preference information may be included as part of social-networking information (e.g., on the social graph) associated with the callee-user. In particular embodiments, there may be a negative condition if the callee-user is determined to have a mood or sentiment (e.g., as described above, based on user inputs and interactions) indicating that the callee-user may not be interested in a call session generally, or a call session with the caller-user. As an example and not by way of limitation, a callee-user may be viewing articles that suggest the user is stressed, which may indicate that the callee-user is not interested in a call session. In particular embodiments, information corresponding to an occurrence of a negative condition may include information about a history of behavior of the callee-user. As an example and not by way of limitation, if a callee-user typically denies call sessions between 8 a.m. and 5 p.m., the communication system 803 may interpret this information as causing a negative condition to occur between those hours. The relationship between the callee-user and the caller-user may be analyzed alongside the history of behavior to determine if a negative condition has occurred. As an example and not by way of limitation, if the callee-user from the previous example has a history of accepting call sessions from coworkers between 8 a.m. and 5 p.m., there may not be a negative condition for a coworker-caller-user between those hours but there may be a negative condition for a non-coworker.

In particular embodiments, the information corresponding to an occurrence of a negative condition may include information specifying a determination that the caller-user cannot initiate a call session with the callee-user, or that the caller-user is among a group of users who do not have permission to initiate a call session with the callee-user. The determination may be dependent on preferences configured by the callee-user, preferences configured by the caller-user, attributes of the call session, device status for the client system 130 of the callee-user, and device status for the client system 130 of the caller-user. Attributes of the call session may include the time of day, current network bandwidth ability for the callee-user and/or the caller-user, or any other suitable attribute of the call session. The device status may include the battery level of the client systems 130 of the callee-user and/or the caller-user (e.g., if the callee-user/caller-user has a low battery level, that may be a negative condition), available memory or processor ability on the client systems 130 of the callee-user and/or the caller-user (e.g., if the callee-user/caller-user is playing a memory- or processor-intensive video game such that a call session would be disruptive to the callee-user, that may be a negative condition), audio/video capabilities of the client systems 130 of the callee-user and/or the caller-user (e.g., if the caller-user/caller-user does not have the requisite software or hardware to support audio/video, that may be a negative condition). In particular embodiments, there may be a negative condition if the callee-user and/or the caller-user do not have the most updated software to enable a call session, or do not have compatible software to enable the call session. As an example and not by way of limitation, if the users have different versions of a communications application being used to establish a call session, that may be a negative condition. As another example and not by way of limitation, if the users do not have compatible codecs, that may be negative condition. In particular embodiments, there may be a negative condition if the callee-user has already established a different call session, such that the call may be ongoing. In such a case, the callee-user may not be available for another call session, at least for the duration of the established call session. In particular embodiments, there may be a negative condition if a privacy setting of the callee-user specifies that the callee-user does not permit call sessions initiated by other users.

Although this disclosure focuses on negative conditions that indicate a lack of interest or availability of the callee-user, the disclosure contemplates positive conditions that indicate interest or availability of the callee-user. A positive condition may simply be the converse of a negative condition. As an example and not by way of limitation, the occurrence of a positive condition may be a user preference indicating that the callee-user is interested in a call session with a caller-user, rather than a user preference indicating that the callee-user is not interested in a call session with a caller-user. As another example and not by way of limitation, a positive condition may be a mood or sentiment of the callee-user indicating that the callee-user may be interested in a call session generally, or a call session with the caller-user (e.g., the callee-user may be in a depressed mood, such that a call session may be of cheer to the callee-user).

In particular embodiments, the occurrences of trigger events, negative conditions, and positive conditions may be weighted in a suitable manner to determine the availability-score for a particular caller-user. As an example and not by way of limitation, a negative condition from a pattern of behavior may be weighted less than a negative condition from a relationship. As another example and not by way of limitation, negative conditions may be weighted higher than positive conditions. In particular embodiments, a negative condition may be weighted so highly that the availability-score of a particular callee-user may never exceed the threshold value, such that the communication system 803 may not send a notification indicating the availability of the particular callee-user no matter what the other events or conditions are. As an example and not by way of limitation, if a callee-user's privacy settings specify that no users may contact the callee-user, the communication system 803 may weight that negative condition so heavily that no trigger event and no number of positive conditions may be sufficient to produce an availability-score exceeding the threshold value. As an example and not by way of limitation the calculation of the availability-score may be represented by the following example equation:

availability-score=$\alpha(At_1+Bt_2)+Cp_1+Dp_2-En_1-Fn_2$, where $t_1$ and $t_2$ represent trigger events, $p_1$ and $p_2$ represent positive conditions, $n_1$ and $n_2$ represent negative conditions, and $\alpha$, A, B, C, D, E, and F represent respective weights. The values of the weights may be pre-determined for each type of event or condition. Likewise, each event or condition may have pre-determined values. In the example equation, trigger events in general may be weighted higher or lower than the other conditions (e.g., by accordingly weighting $\alpha$).

In particular embodiments, the communication system 803 may receive a request from the client system 130 of the caller-user to initiate the call session. The request may be in response to an input from the caller-user. The input may include a suitable touch gesture (e.g., tapping on the video-call interactive element 610 on a touch-screen), a suitable mouse-click (e.g., positioning a cursor over the video-call interactive element 610 and clicking on it), or any other suitable method of selection. Upon receiving the input, the client system 130 of the caller-user may send a request to the communication system 803 to initiate the call session. Although this disclosure describes receiving a particular request from a particular user in a particular manner, this disclosure contemplates receiving any suitable request from any suitable user in any suitable manner.

In particular embodiments, the communication system 803 may establish the call session to enable a media stream from the client system 130 of the caller-user to be received at the client system 130 of the callee-user. In particular embodiments, the media stream may include media captured at the client system 130 of the caller-user. As an example and not by way of limitation, the client system 130 of the caller-user may include a camera (or may be connected to or otherwise associated with a camera) that captures video which may be sent as a video stream. Establishing a call session may involve a process of negotiation between the client system 130 of the callee-user and the client system 130 of the caller-user. In particular embodiments, the negotiation may be mediated by the communication system 803 (or another third-party communication system). In particular embodiments, the negotiation may begin with a setup-offer being sent by the client system 130 of the caller-user to the communication system 803. The setup-offer may include caller-information, which may include information about the client system 130 of the caller-user. As an example and not by way of limitation, the caller-information may include information about the hardware (e.g., information about the microphone, camera, display, speakers) and software capabilities (e.g., the operating system, the version of the software being used to initiate the call session) of the caller-user's client system 130. The caller-information may also include information about the codecs (e.g., audio/video codecs) that may be used and that are installed on the caller-user's client system 130. The caller-information may also include information about the type of media that is to be sent and received by both client systems 130. As an example and not by way of limitation, the caller-information may specify that only video is being sent and may further specify that only video will be received by the client system 130 of the caller-user (i.e., that the client system 130 of the callee-user should send back only video). The caller-information may also include a user-identifier of the caller-user, the caller-user's name, profile picture, or any other suitable identifying information. The setup-offer may be relayed by the communication system 803 to the client system 130 of the callee-user. In response, the client system 130 of the callee-user may send back to the communication system 803 a setup-answer, which may include callee-information, which may be the same type of information as the caller-information, but specific to the callee-user and the client system 130 of the callee-user. In particular embodiments, the setup-answer may be sent automatically by the client system 130 of the callee-user without any input by the callee-user. The communication system 803 may relay the setup-answer to the client system 130 of the caller-user. The call session may be established at the conclusion of the negotiation, which may involve one or more agreements being reached by the client systems 130. As an example and not by way of limitation, the client system 130 of the callee-user and the client system 130 of the caller-user may agree upon a particular set of compatible codecs that may be used (e.g., selected from a list of codecs that are installed on both client systems 130) for different media types. At this point, the client systems 130 may be enabled to send and/or receive media streams (e.g., video and/or audio streams) to each other. In particular embodiments, only the client system 130 of the caller-user may be enabled to send a media stream at the conclusion of this negotiation. In particular embodiments, both client systems may be enabled to send media streams to each other. Although this disclosure focuses on particular systems (e.g., the social-networking system 160, the communication system 803) mediating and establishing the call session, the disclosure contemplates the use of any suitable system (e.g., another third-party system associated with a communications application used to facilitate the call). Similarly, although this disclosure focuses on establishing a call session to enable a media stream to be received by a particular system in a particular manner, the disclosure contemplates establishing a call session to enable any suitable data to be received by any suitable system.

In particular embodiments, the communication system 803 may send the media captured at the client system 130 of the caller-user to the client system 130 of the callee-user. In particular embodiments, the media may be sent immediately after the call session is established. The media may be sent as a media stream that includes media of any type. As an example and not by way of limitation, the media stream may be a video stream including video from the client system 130 of the caller-user. FIG. 6B illustrates a display of a callee-user's client system 130 that includes a video stream from the caller-user. In particular embodiments, for video streams, the video of the video stream may be optimized to be displayed with a subregion of the display of the client system 130 of the caller-user, as described above. Also as described above, the subregion may be of any suitable position, size, or shape. As an example and not by way of limitation, referencing FIG. 6B, a video stream from the caller-user (e.g., the user "Michael") may be displayed within the small-overlay-window 630 on the display of the client system 130 of the callee-user (e.g., the user "Prinda"). Alternatively, the video stream may be displayed as a full-screen display. The media stream may include more than one type of media. As an example and not by way of limitation, the media stream may include both video and audio. The media stream may be received at the client system 130 of the callee-user without causing interruption to a current activity on the client system 130 of the callee-user. As an example and not by way of limitation, the client system 130 of the callee-user may receive an audio and/or video stream while the callee-user is reading an article on a news-reader application, and the callee-user may be able to continue reading the article while listening to and/or viewing the media stream. In particular embodiments, the media may be received without any input from the callee-user, such that the callee-user may almost instantaneously (allowing for a time delay in transmission) begin hearing or viewing the media. In particular embodiments, the media stream may be in the form of media-datagrams. The media-datagrams may have been encoded using one or more of agreed-upon codecs corresponding to the media types of the media-datagrams. As an example and not by way of limitation, the client system 130 of the caller-user may encode video using an agreed-upon video codec and may send the resultant video-datagram. The media-datagrams may be sent through a separate channel (i.e., one that is separate from a channel used to send the setup-offer and setup-answer). As an example and not by way of limitation, the client system 130 of the caller-user may send video-datagrams through a User Datagram Protocol (UDP) channel originating from a media stack at the client system 130 of the caller-user. Upon receiving the media-datagrams, the client system 130 of the callee-user may interpret the media-datagrams using one or more of the agreed-upon codecs to display a media stream. Although this disclosure describes sending particular media from a particular user to a particular user in a particular manner, this disclosure contemplates sending any suitable media stream from any suitable user to any suitable user in any suitable manner In particular embodiments, the client system 130 of the callee-user may send a media stream (e.g., including media captured at the client system 130 of the callee-user) to the communication system 803 (or the system that is mediating the call session) to relay to the client system 130 of the caller-user. The media stream sent by the client system 130 of the callee-user may be of the same type as the media stream received from the client system 130 of the caller-user. As an example and not by way of limitation, if the client system 130 of the callee-user had received a media stream including video and audio, it may send back a media stream including video and audio. In particular embodiments, the client system 130 of the callee-user may send the media stream automatically without further input from the callee-user. In particular embodiments, the client system 130 of the callee-user may only send the media stream in response to a reply-input from the callee-user requesting that the media stream be sent. As an example and not by way of limitation, referencing FIG. 6B, the callee-user may perform a gesture (e.g., a tapping gesture, a swipe gesture, a click) over the small-overlay-window 630 or the interactive element 640. This gesture may be interpreted as reply-input requesting that a suitable media stream be sent. In particular embodiments, the callee-user may be able to select among different reply-inputs to specify a media type to send (e.g., audio only, video only, audio and video). Alternatively, the reply-input may be set to always reciprocate what was received from the client system 130 of the callee-user, or at least default to that option. In particular embodiments, following the reply-input specifying a media type, the client system 130 of the callee-user may send a request to the caller-user to accept the specified media type and/or to send back the same media type. The caller-user may enter a suitable input, which may cause the client system 130 of the caller-user to send back a response, accepting or refusing the request. If the response is an acceptance, the call session may be re-established with media streams of the specified media type. If the response is refusal, the callee-user may be presented with a notification about the refusal, and the callee-user may take any suitable action (e.g., proceed with the call session as is, terminate the call session). FIG. 6C illustrates a display of a callee-user's client system 130 following a reply-input from the callee-user requesting that media be sent to the caller-user. In particular embodiments, information associated with the media stream that is being sent from the client system 130 of the callee-user may be displayed on the client system 130 of the callee-user (e.g., as a reference for the callee-user). As an example and not by way of limitation, referencing FIG. 6C, the client system 130 of the callee-user may be sending a video stream and may display the video stream that is being sent in the small-overlay window 650. As another example and not by way of limitation, a client system 130 of the callee-user that is sending an audio stream may display a transcription of the audio, a visual representation of the respective audio waves, or any other suitable information. In particular embodiments, the callee-user may decide to terminate a media stream or to temporarily suspend the media stream and may submit a user input to that effect. As an example and not by way of limitation, referencing FIG. 6B, the callee-user may perform a downward-swipe gesture to hide the video stream being displayed in the small-overlay-window 630. In particular embodiments, the communications application that is being used for establishing the call session may provide one or more notifications that may inform the callee-user about an incoming media stream and provide instructions for interacting with the incoming media stream. As an example and not by way of limitation, referencing FIG. 6B, the communications application may provide a textual notification (e.g., "Michael is sharing live video. Tap to share video back. Swipe down to hide."). In particular embodiments, before a media stream is sent from the client system 130 of the callee-user, the client system 130 of the callee-user and the client system 130 of the caller-user may engage in a re-negotiation process. The re-negotiation process may be similar to the original negotiation process. The client system 130 of the callee-user may send an update-offer to the communication system 803 (or another system that is facilitating the call session), which may relay the update-offer to the client system 130 of the caller-user. The update-offer may include the same type of information as the setup-answer (e.g., including callee-information). In particular embodiments, the update-offer may only be an update of information that may have changed since the setup-answer. As an example and not by way of limitation, the setup-answer may have specified that no media stream was to be sent from the client system 130 of the callee-user. In this example, the update-offer may now specify that a video stream is to be sent (e.g., in response to a user input requesting that a video stream be sent), without re-sending other callee-information (e.g., the callee-user's name) that may have already been sent in the setup-answer.

Upon receiving the update-offer, the client system 130 of the callee-user may send back an update-answer, with any updated caller-information. At the conclusion of the re-negotiation process, the call session may be said to be re-established, such that media datagrams may be sent by the client system 130 of the callee-user on a separate channel, as described above. In particular embodiments, re-establishing a call session may not terminate an existing call session. Rather, re-establishing a call session may merely update the call session based on the terms of the re-negotiation. In particular embodiments, the entire process of negotiating, renegotiating, and establishing a video chat session may, in part, make use of the Session Description Protocol (SDP).

Figure 8:
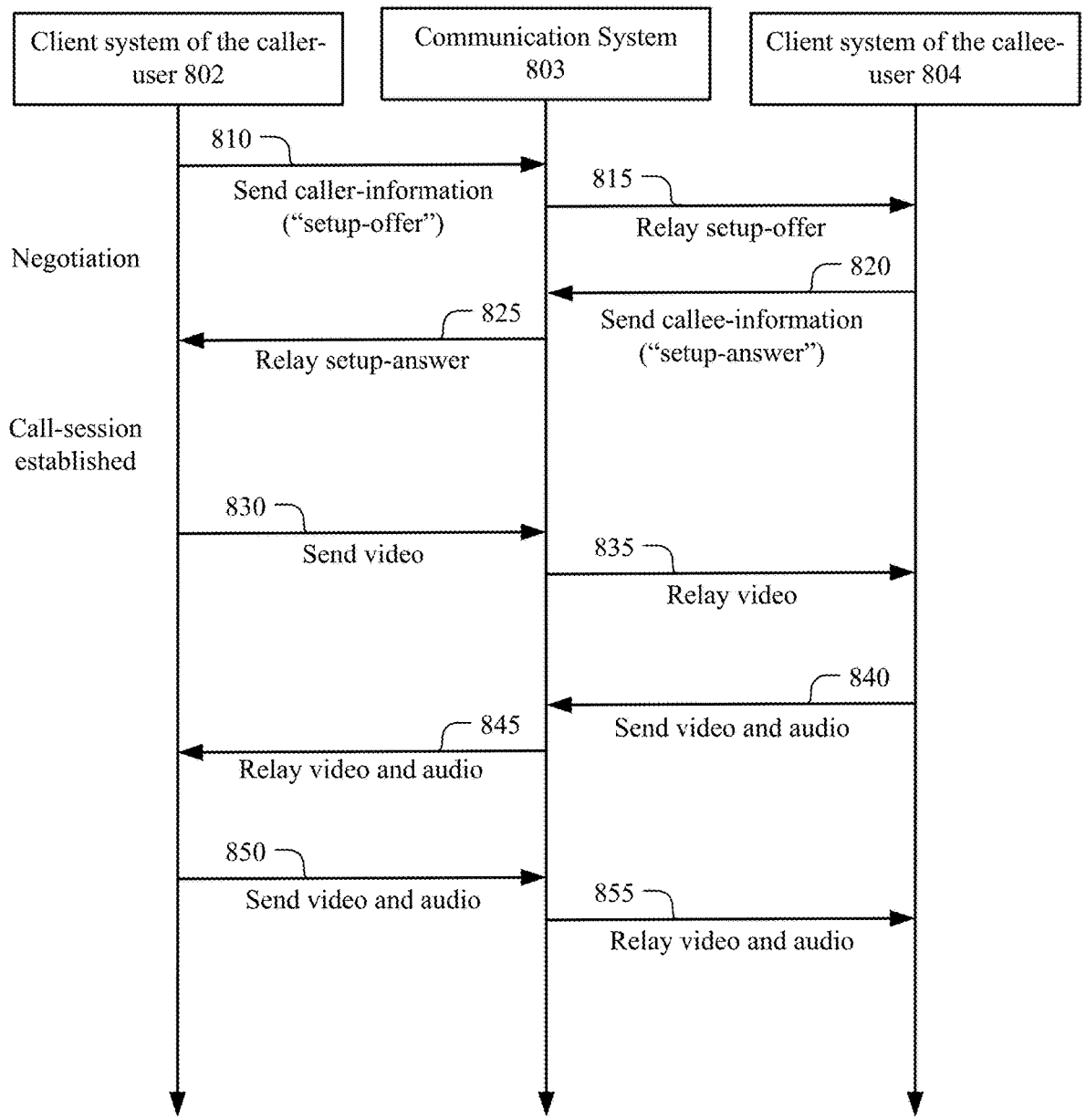
FIG. 8 illustrates an example method for negotiating, establishing, and launching a particular type of call session with audio and video streams.

FIG. 8 illustrates an example method 800 for negotiating, establishing, and launching a particular type of call session with audio and video streams. The method may begin at step 810, where the client system 130 of the caller-user 802 may send a setup-offer (which may include caller-information, as described above) to the communication system 803, beginning the negotiation. At step 815, the communication system 803 may relay the setup-offer to the client system 130 of the callee-user 804. At step 820, the client system 130 of the callee-user 804 may respond with a setup-answer (which may include callee-information, as described above), which may be sent to the communication system 803. At step 825, the communication system 803 may relay the response to the client system 130 of the caller-user 802. At the conclusion of step 825, the call session may be said to be established. At step 830, the client system 130 of the caller-user 802 may send video (e.g., video datagrams) to the communication system 803. At step 835, the communication system 803 may relay the video from the client system 130 of the caller-user 802 to the client system 130 of the callee-user 804. At this point, there may be unidirectional video, from the caller-user to the callee-user. Though not shown in the figure, a re-negotiation and re-establishment may occur at this point. At step 840, the client system 130 of the callee-user 804 may send video and audio to the communication system 803 (e.g., in response to a user input by the callee-user). At step 845, the communication system 803 may relay the video and audio from the client system 130 of the callee-user 804 to the client system 130 of the caller-user 802. Though not shown in the figure, a re-negotiation and re-establishment may occur at this point. At step 850, the client system 130 of the caller-user 802 may send video and audio to the communication system 803. At step 855, the communication system 803 may relay the video and audio to the client system 130 of the callee-user 804. At this point, there may be bidirectional video between the caller-user and the callee-user.

Figures 9A, 9B:
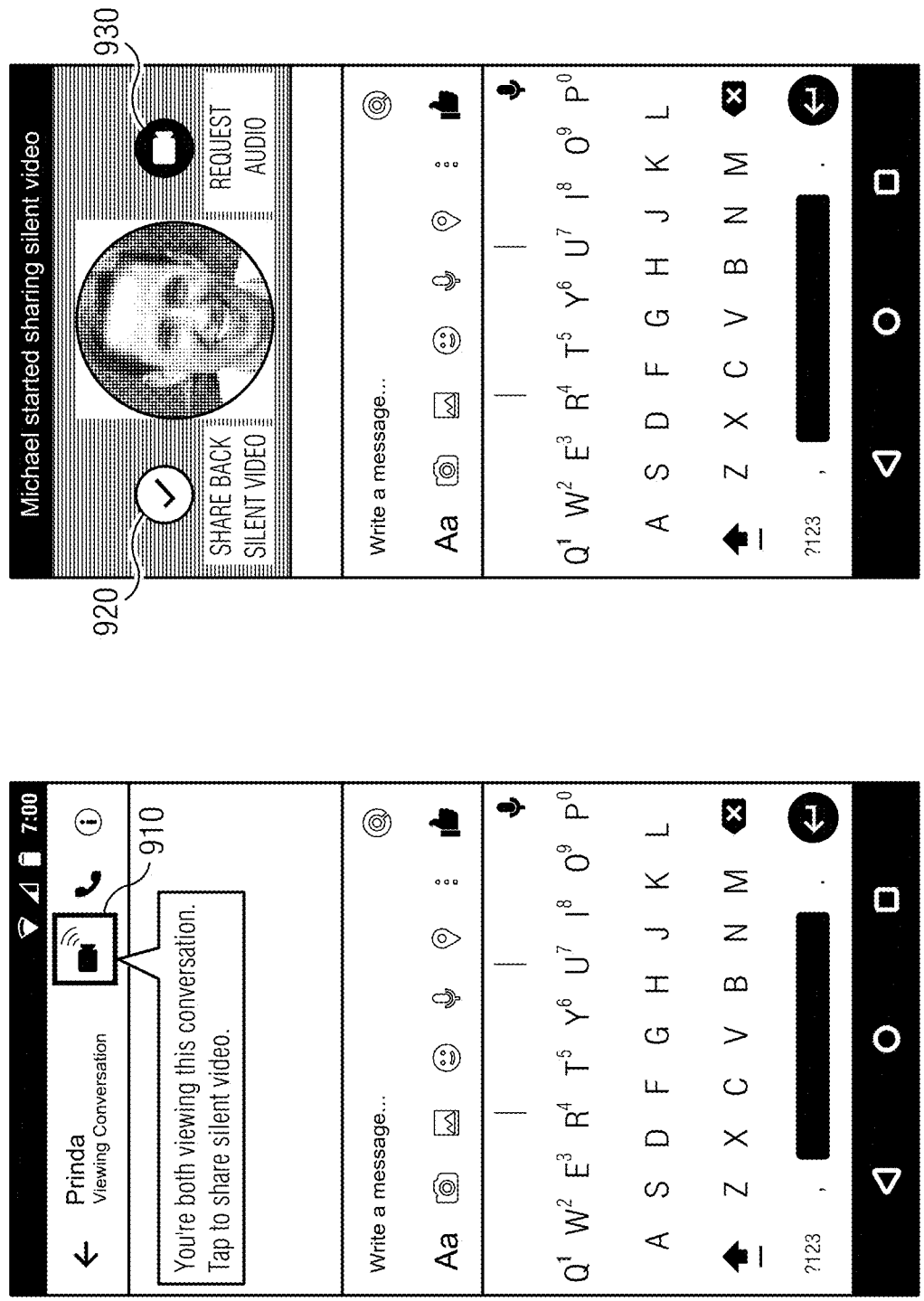
FIG. 9A illustrates a display of the client system of the caller-user that includes a prompt for initiating a silent-video call session
FIG. 9B illustrates a display of the client system of the callee-user receiving unidirectional silent video.
Figure 9D:
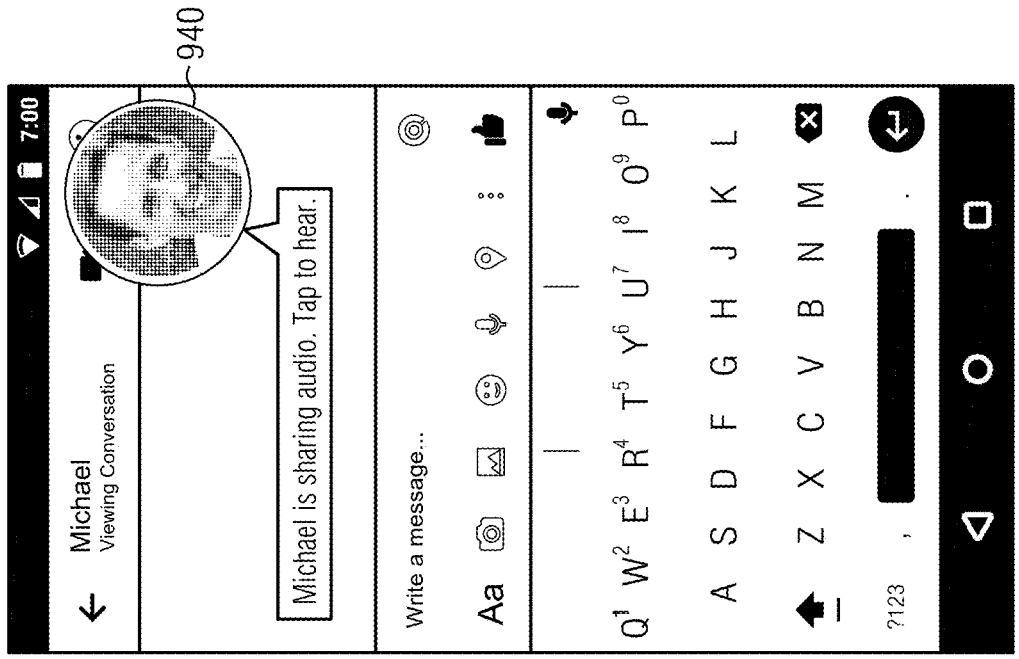
FIG. 9D illustrates a display of the client system of the callee-user with a request to accept audio from the client system of the caller-user.
Figure 9C:
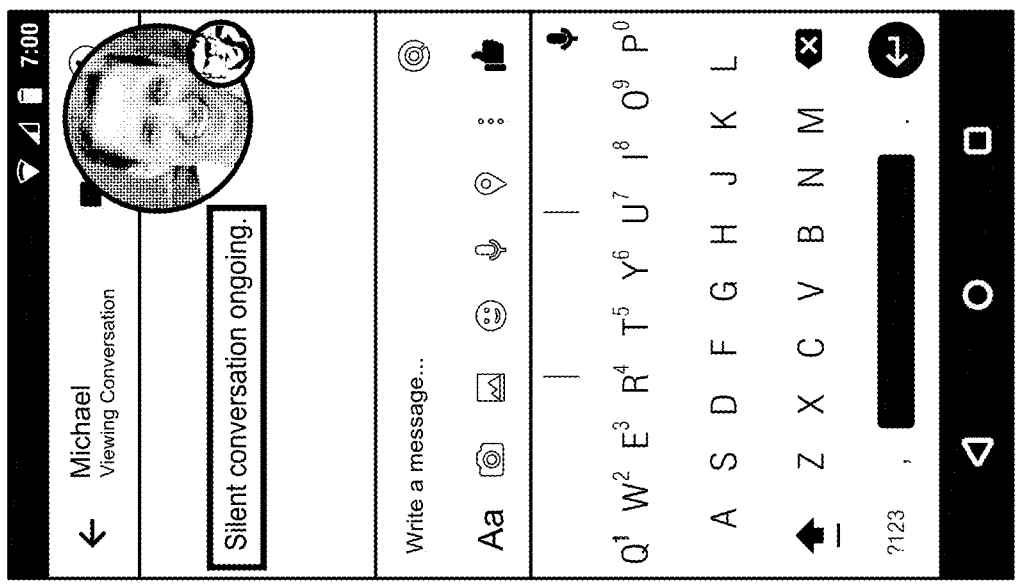
FIG. 9C illustrates a display of the client system of the callee-user during a bidirectional silent-video call session.

In particular embodiments, an established call session may be a "silent-video" call session. A silent-video call session may be a call session where there is no audio being sent by either the client system 130 of the caller-user or the client system 130 of the callee-user. As an example and not by way of limitation, both client systems 130 may send only video streams to each other. Such a call may be advantageous in cases where a user cannot hear audio (e.g., in a crowded bus where it is too noisy) or is in a setting where audio is not appropriate (e.g., in a library, in a room full of strangers). FIG. 9A illustrates a display of the client system 130 of the caller-user that includes a prompt for initiating a silent-video call session. In the example illustrated by FIG. 9A, the caller-user (e.g., the user "Michael") may tap the interactive element 910 to send a video stream with no audio. FIG. 9B illustrates a display of the client system 130 of the callee-user receiving unidirectional silent video. In the example illustrated by FIG. 9B, the callee-user may immediately be able to view the video stream from the client system 130 of the caller-user, in what may be referred to as a unidirectional call session. In this example, the callee-user may be presented with the options of sending back silent video (e.g., by activating the interactive element 920) or additionally requesting audio (e.g., by activating the interactive element 930). The callee-user may also have the option of hiding the video stream or terminating the call session entirely using any suitable method described above (e.g., performing a downward-swipe gesture). FIG. 9C illustrates a display of the client system 130 of the callee-user during a bidirectional silent-video call session. In this example, the callee-user may have opted to send back silent video. FIG. 9D illustrates a display of the client system 130 of the callee-user with a request to accept audio from the client system 130 of the caller-user. In this example, the caller-user may have submitted an input to re-establish the call session, such that the client system 130 of the caller-user may send both video and audio (thereby causing it to no longer be silent video). The callee-user may be presented with the option of accepting or denying the audio. The callee-user may submit a suitable input to make the desired selection. As an example and not by way of limitation, the callee-user may tap on the small-overlay-window 940 or may tap on the textual notification prompt. In particular embodiments, the callee-user may also have the option of sending back audio to the caller-user. In particular embodiments, the client system 130 of the callee-user may automatically send back audio if the callee-user accepts the audio from the caller-user.

Figure 10D:
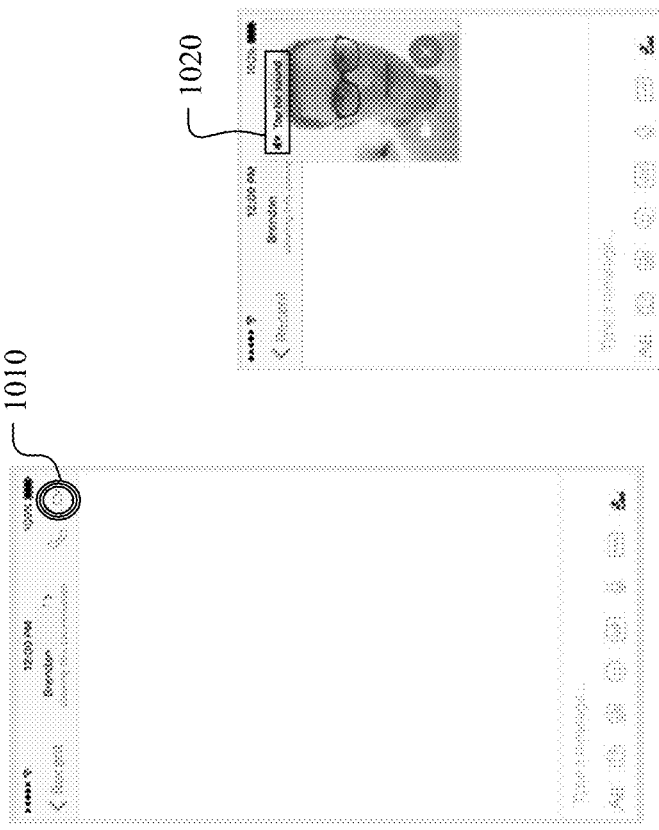
FIGS. 10A-10D illustrate example displays of the client system of the callee-user at different stages of establishing a bidirectional video-call session.
Figure 10C:
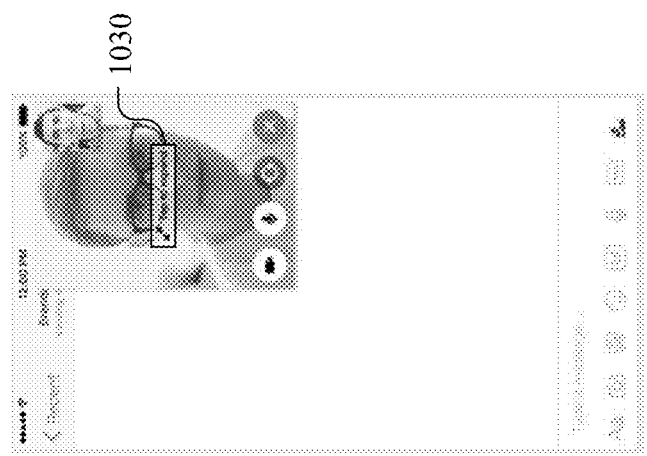
Figure 10B:
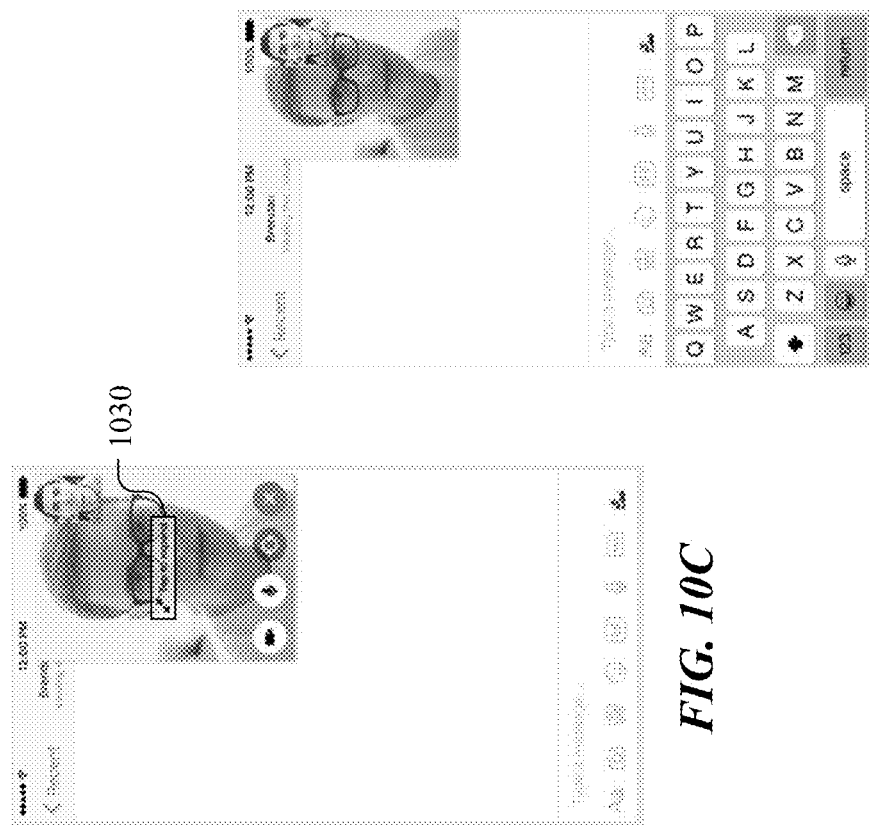
Figure 10A:
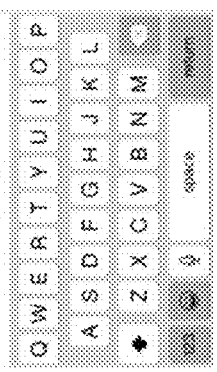

FIGS. 10A-10D illustrate additional example displays of the client system 130 of the callee-user at different stages of establishing a bidirectional video-call session. Referencing FIG. 10A, the callee-user and the caller-user (e.g., a user named "Brendan") may both be viewing a common chat thread within a chat application. The client system 130 of the callee-user may display one or more suitable indications that this is the case. As an example and not by way of limitation, referencing FIG. 10A, a text notification with the text "Viewing this conversation" may be displayed, indicating that the caller-user is viewing the same chat thread (or "conversation"). As another example and not by way of limitation, referencing FIG. 10A, the interactive element 1010 may be animated (e.g., with a ripple animation emanating from the interactive element 1010) to draw the callee-user's attention or otherwise indicate that the caller-user is viewing the conversation. Referencing FIG. 10B, the caller-user may have begun sharing a video stream with the callee-user, and the client system 130 of the callee-user may display this video stream without any action or input from the callee-user. Again referencing FIG. 10B, in order to receive an audio stream, the callee-user may select the interactive element 1020. Referencing FIG. 10C, the callee-user may have elected to share back a media stream with the caller-user. At this point, there is at least a bi-directional video stream. There may also be a uni-directional or bi-directional audio stream (depending on user selections or preferences). FIG. 10C also illustrates interactive elements that may be selected by the callee-user to modify the call session or the user interface. For example, referencing FIG. 10C, the callee-user may select the interactive element 1030 to resize (e.g., "expand") the small-overlay-window (and/or the first-user-small-overlay-window) displaying the video stream from the caller-user. As another example, referencing FIG. 10C, there may be interactive elements for enabling or disabling audio or video, selecting a front- or back-facing camera, or ending the call session. Referencing FIG. 10D, the call session may have continued for a threshold amount of time without user input from the callee-user, and may have consequently caused the interactive elements to no longer be visible. The interactive elements may become visible again if the callee-user taps on or otherwise submits an input to the client system 130 of the callee-user.

Figure 11C:
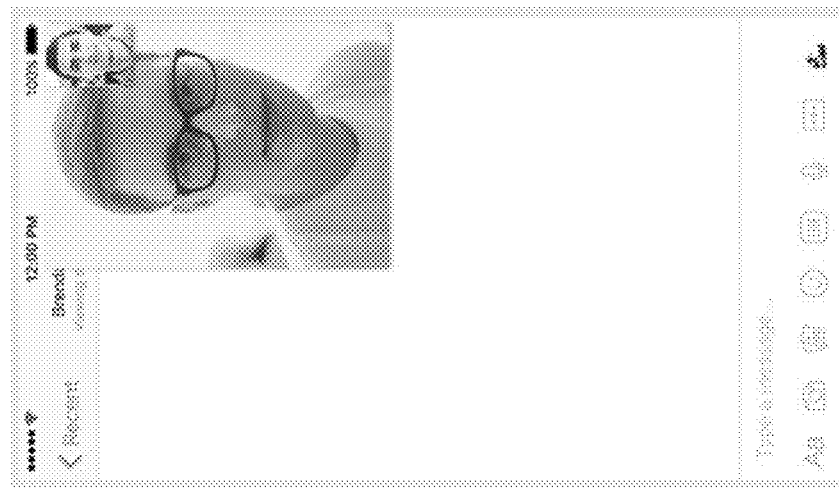
FIGS. 11A-11C illustrate example displays of the client system of the caller-user at different stages of establishing a bidirectional video-call session.
Figure 11B:
Figure 11A:
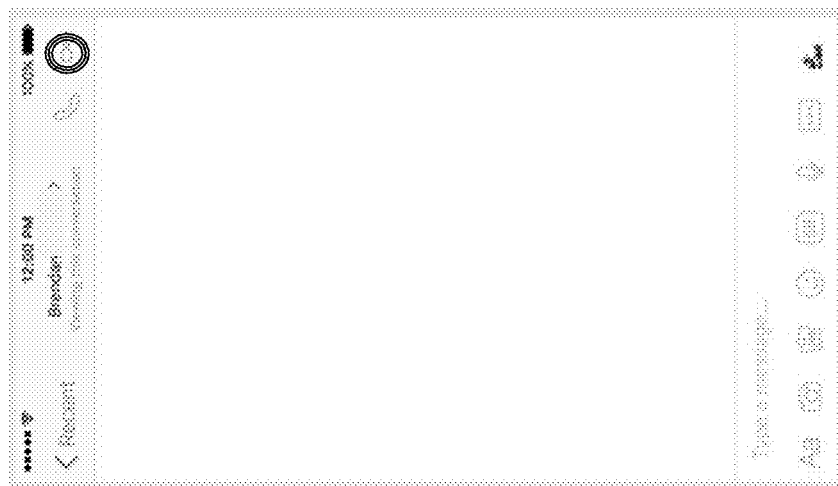

FIGS. 11A-11B illustrate additional example displays of the client system 130 of the caller-user at different stages of establishing a bidirectional video-call session. Referencing FIG. 11A, the callee-user (e.g., in this set of figures, a user named "Brendan") and the caller-user may both be viewing a common chat thread within a chat application. The client system 130 of the caller-user may display a text notification and/or an animation indicating that the callee-user is viewing the same chat thread (as explained above in the context of the client system 130 of the callee-user). To the caller-user this may be an indication that the callee-user is available for a call session. Referencing FIG. 11B, the caller-user may have begun sharing a media stream with the callee-user (e.g., the video stream displayed in the small-overlay-window). The client system 130 of the caller-user may display a notification that the callee-user is receiving or viewing the video stream (e.g., the text notification 1110). Referencing FIG. 11C, the callee-user may have elected to share back a media stream, and the video of the media stream may be displayed in the small-overlay-window displayed in FIG. 11C.

Figure 12:
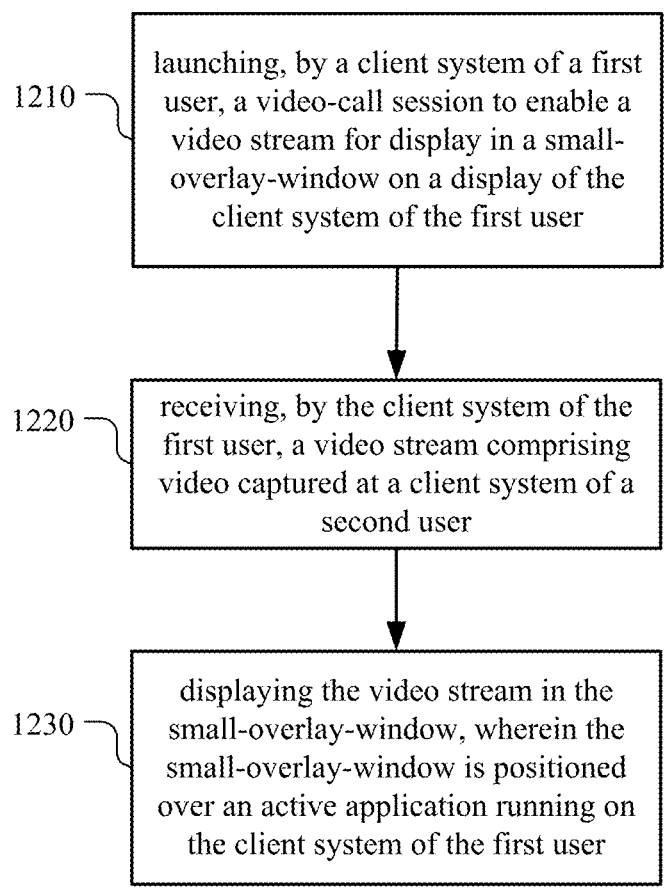
FIG. 12 illustrates an example method for displaying a video stream for a video-call session in a small-overlay-window.

FIG. 12 illustrates an example method 1200 for displaying a video stream for a video-call session in a small-overlay-window. The method may begin at step 1210, where a client system 130 may launch a video-call session to enable a video stream for display in a small-overlay-window on a display of the client system 130 of the first user. At step 1220, the client system 130 of the first user may receive a video stream comprising video captured at a client system 130 of a second user. At step 1230, the client system 130 of the first user may display the video stream in the small-overlay-window, wherein the small-overlay-window is positioned over an active application running on the client system 130 of the first user. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for displaying a video stream for a video-call session in a small-overlay-window including the particular steps of the method of FIG. 12, this disclosure contemplates any suitable method for displaying a video stream for a video-call session in a small-overlay-window including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Figure 13:
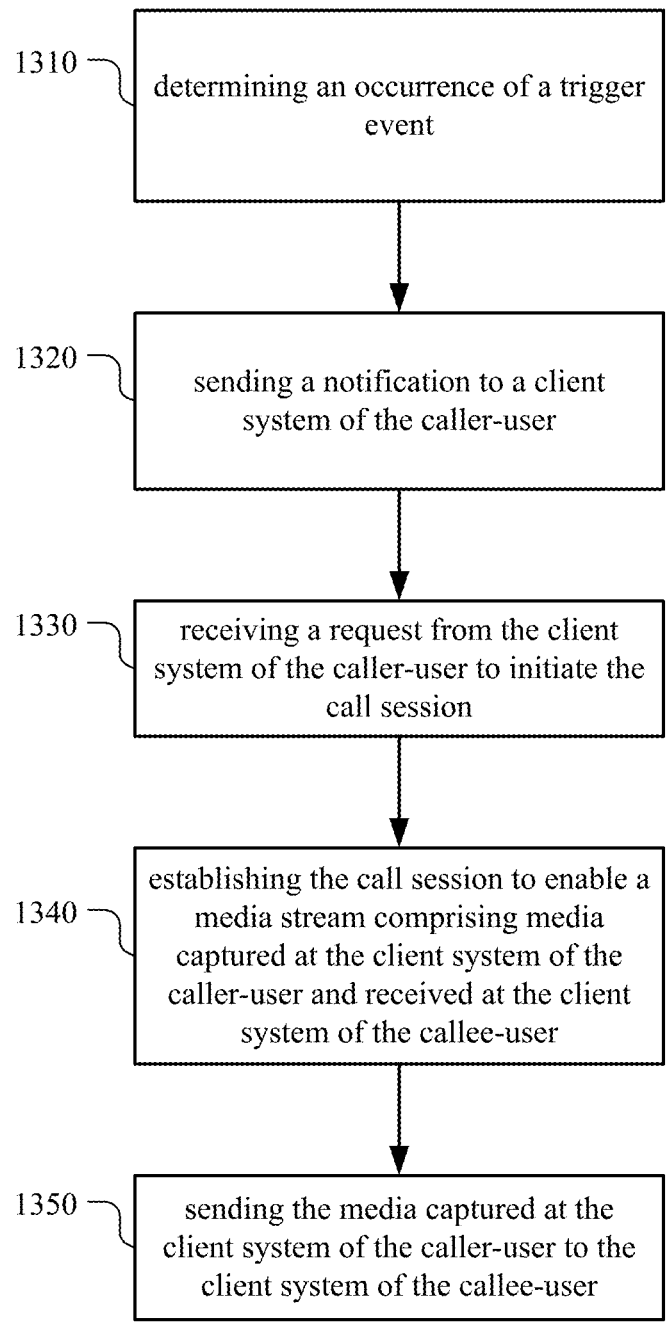
FIG. 13 illustrates an example method for notifying a caller-user of an availability of a callee-user and establishing a call session requested by the caller-user.

FIG. 13 illustrates an example method 1300 for notifying a caller-user of an availability of a callee-user and establishing a call session requested by the caller-user. The method may begin at step 1310, where the communication system 803 (e.g., the social-networking system 160) may determine an occurrence of a trigger event. At step 1320, the communication system 803 may send a notification to a client system 130 of the caller-user. At step 1330, the communication system 803 may receive a request from the client system 130 of the caller-user to initiate the call session. At step 1340, the communication system 803 may establish the call session to enable a media stream comprising media captured at the client system 130 of the caller-user and received at the client system 130 of the callee-user. At step 1350, the communication system 803 may send the media captured at the client system 130 of the caller-user to the client system 130 of the callee-user. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for notifying a caller-user of an availability of a callee-user and establishing a call session requested by the caller-user including the particular steps of the method of FIG. 13, this disclosure contemplates any suitable method for notifying a caller-user of an availability of a callee-user and establishing a call session requested by the caller-user including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13.

Figure 14:
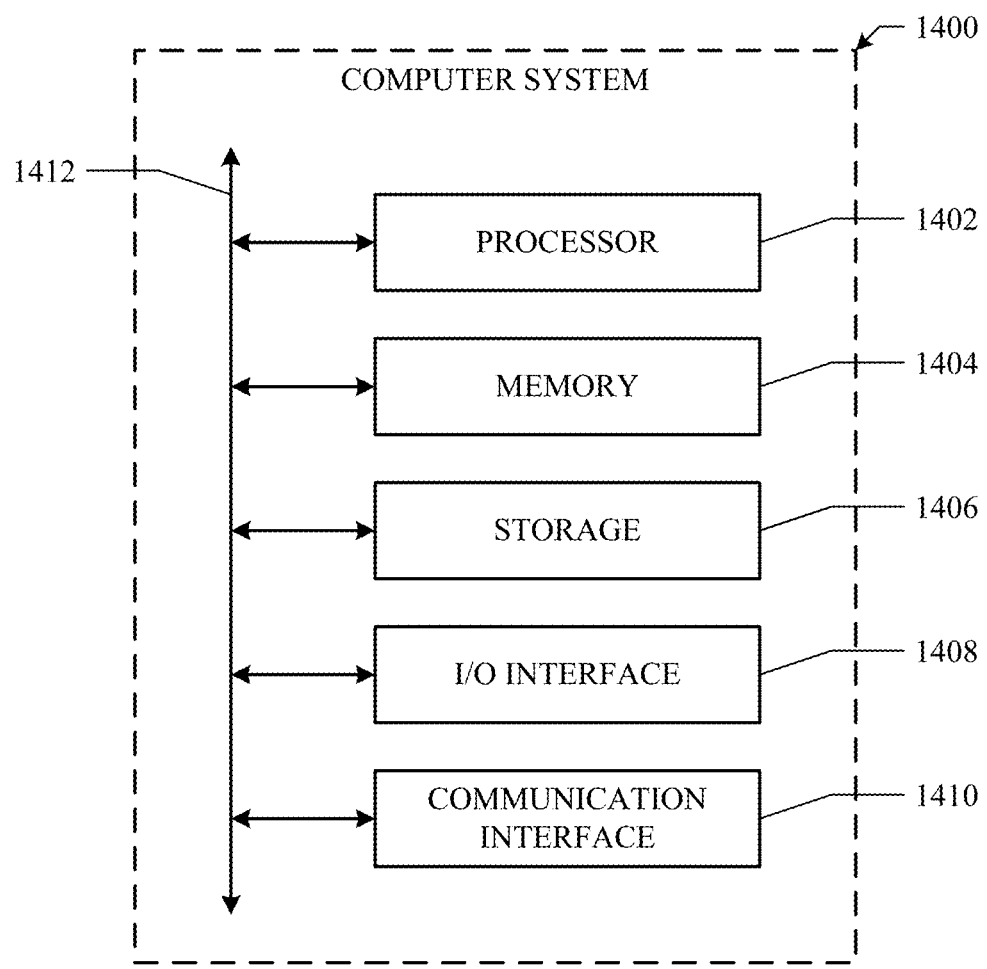
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   determining, by a computer server machine, that a callee-user is available for a communication session based on geographic location information associated with a client system of the callee-user;
   sending, by the computer server machine, in response to determining that the callee-user is available, a notification to a client system of a caller-user indicating that the callee-user is available;
   receiving, by the computer server machine, a request from the client system of the caller-user to initiate the communication session;
   establishing, by the computer server machine, the communication session to enable a media stream comprising media captured at the client system of the caller-user to be received at the client system of a callee-user; and
   sending, by the computer server machine, the media captured at the client system of the caller-user to the client system of the callee-user.

2. The method of claim 1, wherein determining that the callee-user is available for the communication session comprises:
   determining that the geographic location information associated with the client system of the callee-user corresponds to a geographic location that is suitable for the communication session.

3. The method of claim 1, wherein the captured media has a media type comprising video only, audio only, or both video and audio.

4. The method of claim 1, wherein the establishing the communication session comprises:
receiving a setup-offer from the client system of the caller-user, wherein the setup-offer comprises information corresponding to one or more capabilities of the client system of the caller-user; and
receiving a setup-answer from the client system of the callee-user, wherein the setup-answer comprises information corresponding to one or more capabilities of the client system of the callee-user.

5. The method of claim 4, wherein the capabilities of the client system of the caller-user comprises an identification of one or more codecs, wherein the capabilities of the client system of the callee-user comprises an identification of one or more codecs, and further comprising:
determining one or more compatible codecs to be used in the communication session, wherein the media stream comprises datagrams encoded using one of the compatible codecs.

6. The method of claim 1, further comprising:
receiving a reply-input from the client system of the callee-user;
re-establishing the communication session, the media stream further comprising media captured at the client system of the callee-user and received at the client system of the caller-user; and
sending the media captured at the client system of the callee-user to the client system of the caller-user.

7. The method of claim 6, wherein the reply-input specifies a media type to be sent by the callee-user, wherein the media type to be sent by the callee-user differs from the media type of the media captured at the client-system of the caller-user.

8. The method of claim 6, wherein the reply-input specifies a media type required by the callee-user for the media stream, and further comprising:
sending a request to the caller-user to accept the specified media type;
receiving a response from the caller-user regarding the request; and
if the response comprises acceptance of the specified media type, re-establishing the communication session, the media stream comprising only media of the specified media type;
else if the response comprises refusal to accept the specified media type, providing a notification to the callee-user regarding the refusal.

9. The method of claim 1, wherein determining that the callee-user is available for the communication session is further based on an occurrence of one or more negative conditions, the one or more negative conditions comprising information indicating that the client system of the callee-user is not available for the communication session.

10. The method of claim 9, wherein the one or more negative conditions further comprise a user preference of the callee-user indicating that the callee-user is not interested in the communication session.

11. The method of claim 9, wherein the one or more negative conditions further comprise information about a history of behavior of the callee-user.

12. The method of claim 9, wherein the one or more negative conditions further comprise information indicating the callee-user has already established a different communication session with a different user.

13. The method of claim 9, wherein the one or more negative conditions further comprise information about a privacy setting of the callee-user specifying that the callee-user does not permit communication sessions initiated by other users.

14. The method of claim 9, wherein the one or more negative conditions further comprise information about a mood or sentiment of the callee-user indicating that the callee-user is not interested in the communication session.

15. The method of claim 9, further comprising:
accessing a social graph comprising a plurality of nodes and a plurality of edges connecting the nodes, each of the edges between two of the nodes representing a single degree of separation between them, the nodes comprising:
a first node corresponding to the callee-user;
a second node corresponding to the caller-user; and
a plurality of other nodes that each correspond to concepts or users associated with the computer server machine; and
wherein the one or more negative conditions further comprise information about one or more of the other nodes that are connected to the first node or the second node.

16. The method of claim 15, wherein the information based on the one or more of the other nodes indicates that there is more than a single degree of separation between the first node and the second node.

17. The method of claim 15, wherein the information based on the one or more of the other nodes indicates that the second node is among a group of nodes corresponding to users who cannot initiate a communication session with the callee-user.

18. The method of claim 1, wherein, if the media stream comprising media captured at the client system of the caller-user comprises a video stream, the video of the video stream is optimized to be displayed within a subregion of the display of the client system of the callee-user.

19. One or more computer-readable non-transitory storage media embodying software that is operable when executed to:
determine that a callee-user is available for a communication session based on geographic location information associated with a client system of the callee-user;
send, in response to determining that the callee-user is available, a notification to a client system of a caller-user indicating that the callee-user is available;
receive a request from the client system of the caller-user to initiate the communication session;
establish the communication session to enable a media stream comprising media captured at the client system of the caller-user to be received at the client system of a callee-user; and
send the media captured at the client system of the caller-user to the client system of the callee-user.

20. A system comprising: one or more processors; and a memory coupled to the processors comprising instructions executable by the processors, the processors being operable when executing the instructions to:
determine that a callee-user is available for a communication session based on geographic location information associated with a client system of the callee-user;
send, in response to determining that the callee-user is available, a notification to a client system of a caller-user indicating that the callee-user is available;
receive a request from the client system of the caller-user to initiate the communication session;

establish the communication session to enable a media stream comprising media captured at the client system of the caller-user to be received at the client system of a callee-user; and send the media captured at the client system of the caller-user to the client system of the callee-user.

* * * * *